US012672111B2

(12) United States Patent (10) Patent No.: US 12,672,111 B2
Zhang et al. (45) Date of Patent: Jun. 30, 2026

(54) TECHNIQUES FOR USER EQUIPMENT SUB-BAND FULL-DUPLEX OPERATION

(71) Applicant: QUALCOMM Incorporated, San Diego, CA (US)

(72) Inventors: Qian Zhang, Basking Ridge, NJ (US); Yan Zhou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 295 days.

(21) Appl. No.: 18/471,243

(22) Filed: Sep. 20, 2023

(65) Prior Publication Data

US 2025/0097902 A1 Mar. 20, 2025

(51) Int. Cl.
H04W 72/02 (2009.01)
H04L 5/14 (2006.01)
H04W 72/0446 (2023.01)

(52) U.S. Cl.
CPC ............... H04W 72/02 (2013.01); H04L 5/14 (2013.01); H04W 72/0446 (2013.01)

(58) Field of Classification Search
None
See application file for complete search history.

(56) References Cited

U.S. PATENT DOCUMENTS

2025/0007642 A1* 1/2025 You ........................... H04L 5/00
2025/0254018 A1* 8/2025 Grant .................. H04L 27/2605

* cited by examiner

*Primary Examiner* — Marcus Smith
*Assistant Examiner* — Francesca Lima Santos
(74) *Attorney, Agent, or Firm* — Holland & Hart, LLP

(57) ABSTRACT

Methods, systems, and devices for wireless communications are described. A user equipment (UE) may receive a control message indicating configuration information associated with one or more sub-band full-duplex (SBFD) symbols or slots, wherein the configuration information indicates both uplink resources and downlink resources within at least one SBFD symbol or slot of the one or more SBFD symbols or slots. In some cases, the UE may select both the uplink resources and the downlink resources for the at least one SBFD symbol slot of the one or more SBFD symbols or slots based on a capability of the UE. Additionally, the UE may communicate via both the uplink resources and the downlink resources during the at least one SBFD symbol or slot of the one or more SBFD symbols or slots based on the selection.

30 Claims, 16 Drawing Sheets

Network
Entity

Transceiver

1210

Antenna

1215

Communications
Manager

1220

Memory

Code

1230

1225

1240

Processor

1235

1205

1200

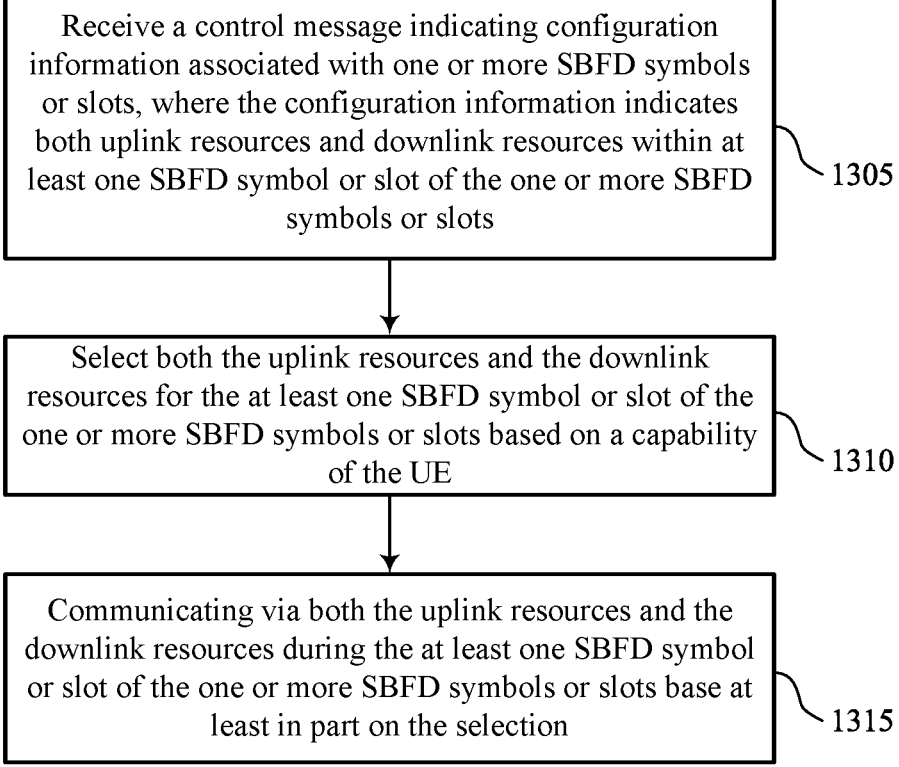

Receive a control message indicating configuration information associated with one or more SBFD symbols or slots, where the configuration information indicates both uplink resources and downlink resources within at least one SBFD symbol or slot of the one or more SBFD symbols or slots

1305

Select both the uplink resources and the downlink resources for the at least one SBFD symbol or slot of the one or more SBFD symbols or slots based on a capability of the UE

1310

Communicating via both the uplink resources and the downlink resources during the at least one SBFD symbol or slot of the one or more SBFD symbols or slots base at least in part on the selection

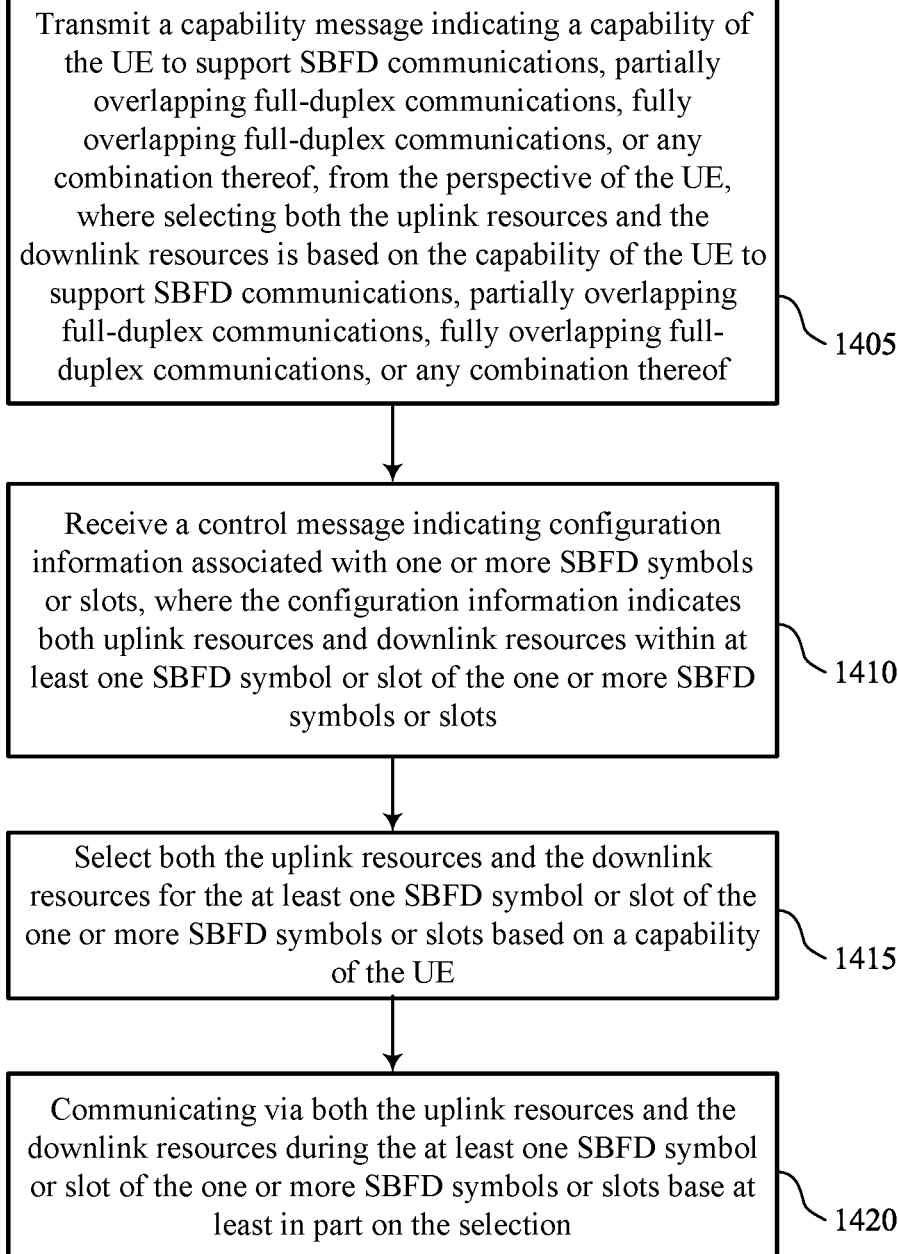

Transmit a capability message indicating a capability of the UE to support SBFD communications, partially overlapping full-duplex communications, fully overlapping full-duplex communications, or any combination thereof, from the perspective of the UE, where selecting both the uplink resources and the downlink resources is based on the capability of the UE to support SBFD communications, partially overlapping full-duplex communications, fully overlapping full-duplex communications, or any combination thereof

1405

Receive a control message indicating configuration information associated with one or more SBFD symbols or slots, where the configuration information indicates both uplink resources and downlink resources within at least one SBFD symbol or slot of the one or more SBFD symbols or slots

1410

Select both the uplink resources and the downlink resources for the at least one SBFD symbol or slot of the one or more SBFD symbols or slots based on a capability of the UE

1415

Communicating via both the uplink resources and the downlink resources during the at least one SBFD symbol or slot of the one or more SBFD symbols or slots base at least in part on the selection

Figure 15:
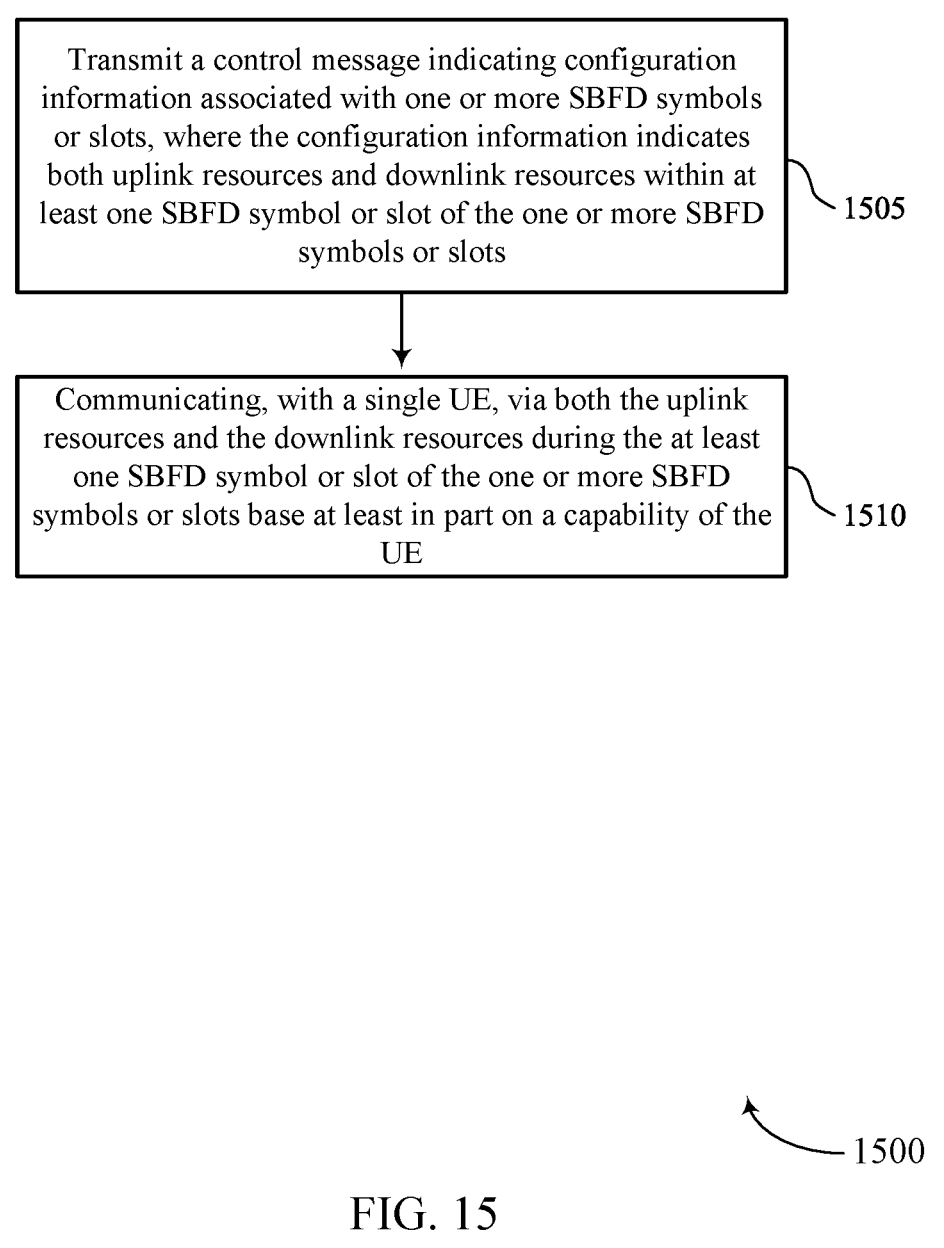

Transmit a control message indicating configuration information associated with one or more SBFD symbols or slots, where the configuration information indicates both uplink resources and downlink resources within at least one SBFD symbol or slot of the one or more SBFD symbols or slots

∿ 1505

Communicating, with a single UE, via both the uplink resources and the downlink resources during the at least one SBFD symbol or slot of the one or more SBFD symbols or slots base at least in part on a capability of the UE

Figure 16:
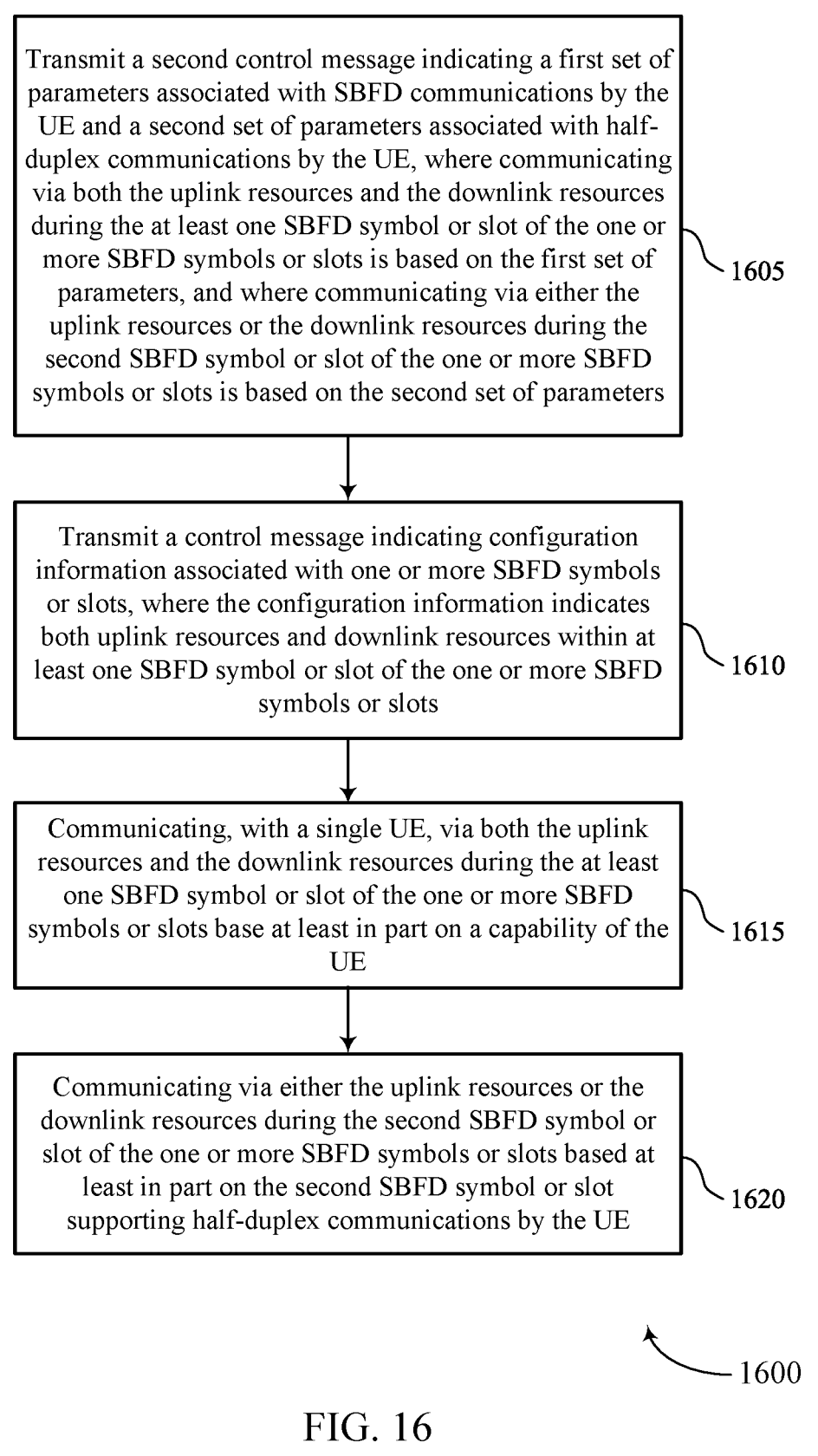

Transmit a second control message indicating a first set of parameters associated with SBFD communications by the UE and a second set of parameters associated with half-duplex communications by the UE, where communicating via both the uplink resources and the downlink resources during the at least one SBFD symbol or slot of the one or more SBFD symbols or slots is based on the first set of parameters, and where communicating via either the uplink resources or the downlink resources during the second SBFD symbol or slot of the one or more SBFD symbols or slots is based on the second set of parameters

1605

Transmit a control message indicating configuration information associated with one or more SBFD symbols or slots, where the configuration information indicates both uplink resources and downlink resources within at least one SBFD symbol or slot of the one or more SBFD symbols or slots

1610

Communicating, with a single UE, via both the uplink resources and the downlink resources during the at least one SBFD symbol or slot of the one or more SBFD symbols or slots base at least in part on a capability of the UE

1615

Communicating via either the uplink resources or the downlink resources during the second SBFD symbol or slot of the one or more SBFD symbols or slots based at least in part on the second SBFD symbol or slot supporting half-duplex communications by the UE

TECHNIQUES FOR USER EQUIPMENT SUB-BAND FULL-DUPLEX OPERATION

FIELD OF TECHNOLOGY

The following relates to wireless communications, including techniques for user equipment sub-band full-duplex operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for user equipment (UE) sub-band full-duplex (SBFD) operation. Generally, the techniques described herein may enable a UE, capable of operating according to an SBFD mode, to select resources for communicating with a network entity based on a communicate mode of the network entity. For example, the UE, capable of operating according to the SBFD mode, may receive a control message indicating configuration information associated with one or more SBFD symbols or slots. In some cases, the network entity may support SBFD communications with the UE (e.g., operate according to an SBFD mode with a single UE), such that the configuration information indicates both uplink resources and downlink resources of at least one SBFD symbol or slot of the one or more SBFD symbols or slots. As such, the UE may select both the uplink resources and downlink resources for communicating with the network entity during the at least one SBFD symbol or slot of the one or more SBFD symbols or slots based on the network entity supporting SBFD communications with the UE. Additionally, or alternatively, the network entity may support half-duplex communications with the UE (e.g., the network entity may operate according to a half-duplex mode or according to an SBFD mode with two different UEs), such that configuration information may indicate either uplink resources or downlink resources of a second SBFD symbol or slot of the one or more SBFD symbols or slots. As such, the UE may select either the uplink resources or the downlink resources for communicating with the network entity during the second SBFD symbol or slot of the one or more SBFD symbols or slots based on the second SBFD slot supporting half-duplex communications by the UE (e.g., even though the UE is capable operating according to the SBFD mode). In other words, the UE, capable of operating according to the SBFD mode, may determine whether to select both uplink resources and downlink resources for an SBFD symbol or slot or select either uplink resources or downlink resources for the SBFD symbol or slot based on whether the network entity supports SBFD communications with the UE during the SBFD symbol or slot (e.g., whether the network entity operates according to an SBFD mode with a single UE, according to the SBFD mode with two different UEs, or according to a half-duplex mode).

A method for wireless communications by a UE is described. The method may include receiving a control message indicating configuration information associated with one or more SBFD symbol or slots, where the configuration information indicates both uplink resources and downlink resources within at least one SBFD symbol or slot of the one or more SBFD symbol or slots, selecting both the uplink resources and the downlink resources for the at least one SBFD symbol or slot of the one or more SBFD symbols or slots based on a capability of the UE, and communicating via both the uplink resources and the downlink resources during the at least one SBFD symbol or slot of the one or more SBFD symbols or slots based on the selection.

A UE for wireless communications is described. The UE may include one or more memories storing processor executable code, and one or more processors coupled with the one or more memories. The one or more processors may individually or collectively operable to execute the code to cause the UE to receive a control message indicating configuration information associated with one or more SBFD symbol or slots, where the configuration information indicates both uplink resources and downlink resources within at least one SBFD symbol or slot of the one or more SBFD symbol or slots, select both the uplink resources and the downlink resources for the at least one SBFD symbol or slot of the one or more SBFD symbols or slots based on a capability of the UE, and communicating via both the uplink resources and the downlink resources during the at least one SBFD symbol or slot of the one or more SBFD symbols or slots base at least in part on the selection.

Another UE for wireless communications is described. The UE may include means for receiving a control message indicating configuration information associated with one or more SBFD symbol or slots, where the configuration information indicates both uplink resources and downlink resources within at least one SBFD symbol or slot of the one or more SBFD symbol or slots, means for selecting both the uplink resources and the downlink resources for the at least one SBFD symbol or slot of the one or more SBFD symbols or slots based on a capability of the UE, and means for communicating via both the uplink resources and the downlink resources during the at least one SBFD symbol or slot of the one or more SBFD symbols or slots based on the selection.

A non-transitory computer-readable medium storing code for wireless communications is described. The code may include instructions executable by a processor to receive a control message indicating configuration information associated with one or more SBFD symbol or slots, where the configuration information indicates both uplink resources and downlink resources within at least one SBFD symbol or slot of the one or more SBFD symbol or slots, select both the uplink resources and the downlink resources for the at least one SBFD symbol or slot of the one or more SBFD symbols or slots based on a capability of the UE, and communicating via both the uplink resources and the downlink resources during the at least one SBFD symbol or slot of the one or more SBFD symbols or slots base at least in part on the selection.

In some examples of the method, UEs, and non-transitory computer-readable medium described herein, the configuration information further indicates either uplink resources or downlink resources within a second SBFD symbol or slot of the one or more SBFD symbols or slots and the method, apparatuses, and non-transitory computer-readable medium may include further operations, features, means, or instructions for selecting either the uplink resources or the downlink resources for the second SBFD symbol or slot of the one or more SBFD symbols or slots based on the second SBFD symbol or slot supporting half-duplex communications by the UE and communicating via either the uplink resources or the downlink resources during the second SBFD symbol or slot based on the selection.

Some examples of the method, UEs, and non-transitory computer-readable medium described herein may further include operations, features, means, or instructions for receiving one or more second control messages indicating a configuration of each of the one or more SBFD symbol or slots, where the one or more second control messages indicate the at least one SBFD symbol or slot of the one or more SBFD symbols or slots may be configured for SBFD communications by the UE and the second SBFD symbol or slot of the one or more SBFD symbols or slots may be configured for half-duplex communications by the UE.

In some examples of the method, UEs, and non-transitory computer-readable medium described herein, the one or more second control messages indicates one or more durations associated with the configuration the one or more SBFD symbol or slots.

Some examples of the method, UEs, and non-transitory computer-readable medium described herein may further include operations, features, means, or instructions for receiving one or more third control messages indicating whether each of the one or more SBFD symbols or slots supports SBFD communications by the UE or supports half-duplex communications by the UE.

In some examples of the method, UEs, and non-transitory computer-readable medium described herein, the one or more second control messages include one or more indices indicating the configuration of the one or more SBFD symbols or slots and the one or more indices may be per-SBFD symbol, per-SBFD symbol or slot, or both.

In some examples of the method, UEs, and non-transitory computer-readable medium described herein, a first index of the one or more indices indicates an SBFD symbol or slot of the one or more SBFD symbols or slots may be configured for half-duplex communications by a network entity and by the UE, a second index of the one or more indices indicates the SBFD symbol or slot of the one or more SBFD symbols or slots may be configured for SBFD communications by the network entity and half-duplex communications by the UE, a third index of the one or more indices indicates the SBFD symbol or slot of the one or more SBFD symbols or slots may be configured for SBFD communications by the network entity and by the UE, and a fourth index of the one or more indices indicates the SBFD symbol or slot of the one or more SBFD symbols or slots may be configured for SBFD communications by the UE and half-duplex communications by the network entity.

In some examples of the method, UEs, and non-transitory computer-readable medium described herein, the one or more second control messages indicate a pattern identification associated with the configuration of the one or more SBFD symbol or slots.

In some examples of the method, UEs, and non-transitory computer-readable medium described herein, the pattern identification indicates a first subset of the one or more SBFD symbols or slots may be configured for SBFD communications by the UE, a second subset of the one or more SBFD symbols or slots may be configured for half-duplex communications by the UE, and one or more additional symbols or slots may be configured for uplink, for downlink, may be flexible, or any combination thereof.

In some examples of the method, UEs, and non-transitory computer-readable medium described herein, the one or more second control messages include an RRC message, a MAC-CE message, a DCI message, or any combination thereof and the DCI message may be a scheduling DCI message, a non-scheduling DCI message, a group common DCI message, or any combination thereof.

Some examples of the method, UEs, and non-transitory computer-readable medium described herein may further include operations, features, means, or instructions for receiving a second control message indicating a first set of parameters associated with SBFD communications by the UE and a second set of parameters associated with half-duplex communications by the UE, where communicating via both the uplink resources and the downlink resources during the at least one SBFD symbol or slot of the one or more SBFD symbols or slots may be based on the first set of parameters, and where communicating via either the uplink resources or the downlink resources during the second SBFD symbol or slot of the one or more SBFD symbols or slots may be based on the second set of parameters.

Some examples of the method, UEs, and non-transitory computer-readable medium described herein may further include operations, features, means, or instructions for transmitting a capability message indicating the capability of the UE to support perform SBFD communications, or partial overlapping full-duplex communications, or fully overlapping full-duplex communications, or any combination thereof, from a perspective of the UE at the UE side, where selecting both the uplink resources and the downlink resources may be based on the capability of the UE to support SBFD communications, partially overlapping full-duplex communications, fully overlapping full-duplex communications, or any combination thereof.

Some examples of the method, UEs, and non-transitory computer-readable medium described herein may further include operations, features, means, or instructions for transmitting a capability message indicating the capability of the UE to support half duplex communications from a perspective of the UE and SBFD communications from a perspective of a network entity.

In some examples of the method, UEs, and non-transitory computer-readable medium described herein, communicating via both the uplink resources and the downlink resources during the at least one SBFD symbol or slot of the one or more SBFD symbols or slots may include operations, features, means, or instructions for transmitting uplink signaling via a first antenna panel at the UE and via the uplink resources during the at least one SBFD symbol or slot of the one or more SBFD symbols or slots and receiving downlink signaling via a second antenna panel at the UE and via the downlink resources during the second SBFD symbol or slot of the one or more SBFD symbol or slots.

In some examples of the method, UEs, and non-transitory computer-readable medium described herein, the uplink resources may be associated with one or more uplink sub-bands and the downlink resources may be associated with one or more downlink sub-bands.

In some examples of the method, UEs, and non-transitory computer-readable medium described herein, the control message may be associated with a network entity operating according to an SBFD mode.

A method for wireless communications by an apparatus is described. The method may include transmitting a control message indicating configuration information associated with one or more SBFD symbol or slots, where the configuration information indicates both uplink resources and downlink resources within at least one SBFD symbol or slot of the one or more SBFD symbols or slots and communicating, with a single UE, via both the uplink resources and the downlink resources during the at least one SBFD symbol or slot of the one or more SBFD symbols or slots based on a capability of the UE.

An apparatus for wireless communications is described. The apparatus may include one or more memories storing processor executable code, and one or more processors coupled with the one or more memories. The one or more processors may individually or collectively operable to execute the code to cause the apparatus to transmit a control message indicating configuration information associated with one or more SBFD symbol or slots, where the configuration information indicates both uplink resources and downlink resources within at least one SBFD symbol or slot of the one or more SBFD symbols or slots and communicating, with a single UE, via both the uplink resources and the downlink resources during the at least one SBFD symbol or slot of the one or more SBFD symbols or slots base at least in part on a capability of the UE.

Another apparatus for wireless communications is described. The apparatus may include means for transmitting a control message indicating configuration information associated with one or more SBFD symbol or slots, where the configuration information indicates both uplink resources and downlink resources within at least one SBFD symbol or slot of the one or more SBFD symbols or slots and means for communicating, with a single UE, via both the uplink resources and the downlink resources during the at least one SBFD symbol or slot of the one or more SBFD symbols or slots based on a capability of the UE.

A non-transitory computer-readable medium storing code for wireless communications is described. The code may include instructions executable by a processor to transmit a control message indicating configuration information associated with one or more SBFD symbol or slots, where the configuration information indicates both uplink resources and downlink resources within at least one SBFD symbol or slot of the one or more SBFD symbols or slots and communicating, with a single UE, via both the uplink resources and the downlink resources during the at least one SBFD symbol or slot of the one or more SBFD symbols or slots base at least in part on a capability of the UE.

In some examples of the method, apparatus, and non-transitory computer-readable medium described herein, the configuration information further indicates either uplink resources or downlink resources within a second SBFD symbol or slot of the one or more SBFD symbols or slots and the method, apparatuses, and non-transitory computer-readable medium may include further operations, features, means, or instructions for communicating via either the uplink resources or the downlink resources during the second SBFD symbol or slot of the one or more SBFD symbols or slots based on the second SBFD symbol or slot supporting half-duplex communications by the UE.

Some examples of the method, apparatus, and non-transitory computer-readable medium described herein may further include operations, features, means, or instructions for transmitting one or more second control messages indicating a configuration of each of the one or more SBFD symbol or slots, where the one or more second control messages indicate the at least one SBFD symbol or slot of the one or more SBFD symbols or slots may be configured for SBFD communications by the UE and the second SBFD symbol or slot of the one or more SBFD symbols or slots may be configured for half-duplex communications by the UE.

In some examples of the method, apparatus, and non-transitory computer-readable medium described herein, the one or more second control messages indicates one or more durations associated with the configuration the one or more SBFD symbol or slots.

Some examples of the method, apparatus, and non-transitory computer-readable medium described herein may further include operations, features, means, or instructions for transmitting one or more third control messages indicating whether each of the one or more SBFD symbols or slots supports SBFD communications by the UE or supports half-duplex communications by the UE.

In some examples of the method, apparatus, and non-transitory computer-readable medium described herein, the one or more second control messages include one or more indices indicating the configuration of the one or more SBFD symbols or slots and the one or more indices may be per-SBFD symbol, per-SBFD symbol or slot, or both.

In some examples of the method, apparatus, and non-transitory computer-readable medium described herein, a first index of the one or more indices indicates an SBFD symbol or slot of the one or more SBFD symbols or slots may be configured for half-duplex communications by both a network entity and by the UE, a second index of the one or more indices indicates the SBFD symbol or slot of the one or more SBFD symbols or slots may be configured for SBFD communications by the network entity and half-duplex communications by the UE, a third index of the one or more indices indicates the SBFD symbol or slot of the one or more SBFD symbols or slots may be configured for SBFD communications by both the network entity and by the UE, a fourth index of the one or more indices indicates the SBFD symbol or slot of the one or more SBFD symbols or slots may be configured for SBFD communications by the UE and half-duplex communications by the network entity.

In some examples of the method, apparatus, and non-transitory computer-readable medium described herein, the one or more second control messages indicate a pattern associated with the configuration of the one or more SBFD symbol or slots.

In some examples of the method, apparatus, and non-transitory computer-readable medium described herein, the pattern indicates a first subset of the one or more SBFD symbols or slots may be configured for SBFD communications by the UE and a second subset of the one or more SBFD symbols or slots may be configured for half-duplex communications by the UE, and one or more additional symbols or slots may be configured for uplink, for downlink, may be flexible, or any combination thereof.

In some examples of the method, apparatus, and non-transitory computer-readable medium described herein, the one or more second control messages include an RRC message, a MAC-CE message, a DCI message, or any combination thereof and the DCI message may be a scheduling DCI message, a non-scheduling DCI message, a group common DCI message, or any combination thereof.

Some examples of the method, apparatus, and non-transitory computer-readable medium described herein may further include operations, features, means, or instructions for transmitting a second control message indicating a first set of parameters associated with SBFD communications by the UE and a second set of parameters associated with half-duplex communications by the UE, where communicating via both the uplink resources and the downlink resources during the at least one SBFD symbol or slot of the one or more SBFD symbols or slots may be based on the first set of parameters, and where communicating via either the uplink resources or the downlink resources during the second SBFD symbol or slot of the one or more SBFD symbols or slots may be based on the second set of parameters.

Some examples of the method, apparatus, and non-transitory computer-readable medium described herein may further include operations, features, means, or instructions for receiving a capability message indicating the capability of the UE to support perform SBFD communications, or partial overlapping full-duplex communications, or fully overlapping full-duplex communications, or any combination thereof, from a perspective of the UE at the UE side, where selecting both the uplink resources and the downlink resources may be based on the capability of the UE to support SBFD communications, partially overlapping full-duplex communications, fully overlapping full-duplex communications, or any combination thereof.

Some examples of the method, apparatus, and non-transitory computer-readable medium described herein may further include operations, features, means, or instructions for receiving a capability message indicating the capability of the UE to support half duplex communications from a perspective of the UE and SBFD communications from a perspective of a network entity.

In some examples of the method, apparatus, and non-transitory computer-readable medium described herein, communicating via both the uplink resources and the downlink resources during the at least one SBFD symbol or slot of the one or more SBFD symbols or slots may include operations, features, means, or instructions for receiving uplink signaling via the uplink resources during the at least one SBFD symbol or slot of the one or more SBFD symbols or slots and transmitting downlink signaling via the downlink resources during the at least one SBFD symbol or slot of the one or more SBFD symbol or slots.

In some examples of the method, apparatus, and non-transitory computer-readable medium described herein, the uplink resources may be associated with one or more uplink sub-bands and the downlink resources may be associated with one or more downlink sub-bands.

In some examples of the method, apparatus, and non-transitory computer-readable medium described herein, the control message may be associated with the network entity operating according to an SBFD mode.

BRIEF DESCRIPTION OF THE DRAWINGS

FIG. 3 shows an example of a timing diagram that supports techniques for UE SBFD operation in accordance with one or more aspects of the present disclosure.

FIGS. 13 through 16 show flowcharts illustrating methods that support techniques for UE SBFD operation in accordance with one or more aspects of the present disclosure.

DETAILED DESCRIPTION

Figure 1:
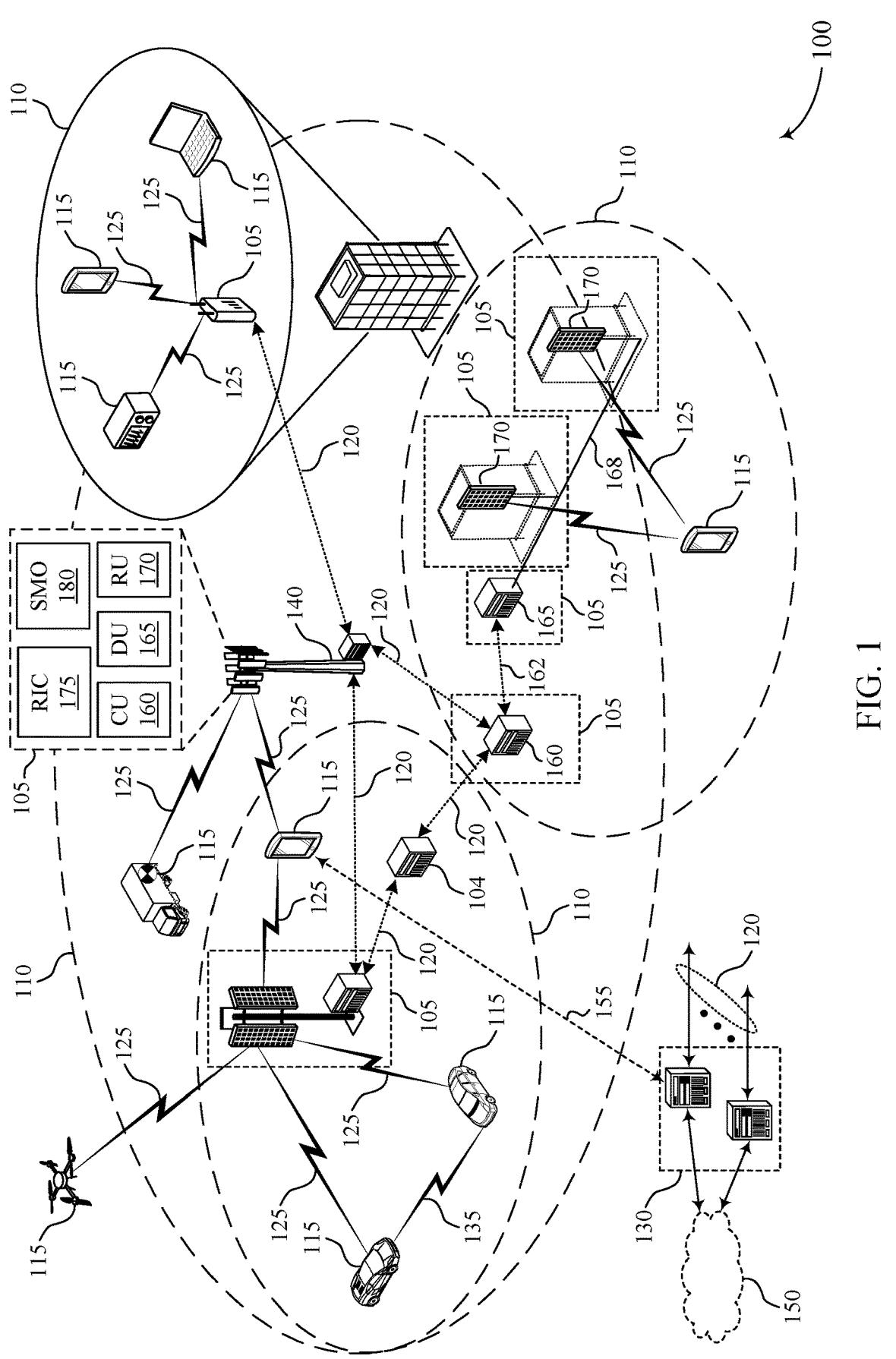
FIG. 1 shows an example of a wireless communications system that supports techniques for user equipment (UE) sub-band full-duplex (SBFD) operation in accordance with one or more aspects of the present disclosure.

In some wireless communications systems, a network entity may operate in a sub-band full-duplex (SBFD) mode. In such cases, the network entity may configure one or more SBFD symbols or slots of a component carrier (CC) with both uplink resources (e.g., one or more uplink sub-bands) and downlink resources (e.g., one or more downlink sub-bands), and may communicate with a first UE via the downlink resources and communicate with a second UE via the uplink resources. In some cases, a UE, such as the first UE or the second UE, may also support an SBFD mode in which the UE is capable of communicating via both uplink resources and downlink resources in an SBFD symbol or slot. As such, the UE and the network entity may support three modes of communication. A first communication mode may include the UE and the network entity performing half-duplex communications in a single symbol or slot (e.g., half-duplex mode UE+half-duplex mode network entity). A second communication mode may include the network entity performing SBFD communications with multiple UEs in a single symbol or slot (e.g., 2 half-duplex mode UEs+ SBFD mode network entity) with a first UE performing half-duplex downlink communications in the single symbol or slot with the network entity and a second UE performing half-duplex uplink communications in the single symbol or slot with the network entity. A third communication mode may include both the UE and the network entity performing SBFD communications in a single symbol or slot (e.g., SBFD mode UE+SBFD mode network entity). In the third communication mode, both the UE and the network entity communicates using both uplink resources and downlink resources in the single symbol or slot. However, a UE capable of operating according to an SBFD mode may receive configuration signaling for an SBFD symbol or slot and may be unaware of whether the UE may communicate via the uplink resource, the downlink resources, or both.

Accordingly, techniques described herein may enable an SBFD capable UE to interpret configuration information for an SBFD symbol or slot. A UE capable of operating according to an SBFD mode may be referred to as an SBFD capable UE, In some examples, a rule may define that an SBFD capable UE may interpret configuration information indicating both uplink resources and downlink resources for an SBFD symbol or slot as being allocated to the SBFD capable UE. As such, the SBFD capable UE may operate according to the SBFD mode, in which the UE may be referred to as an SBFD UE, and the network entity may operate according to the SBFD mode, in which the network entity may be referred to as an SBFD network entity, such that the SBFD UE and the SBFD network entity may operate according to the third communication mode. Additionally, a second rule may define that a UE operating according to a half-duplex mode, which may be referred to as a half-duplex UE, may interpret configuration information indicating both uplink resources and downlink resources of an SBFD symbol or slot as allocating either the uplink resources or the downlink resources to the half-duplex UE. As such, the half-duplex UE and the network entity may operate according to the second communication mode, in which the network entity is an SBFD network entity.

In some cases, an SBFD capable UE may operate according to an SBFD mode in a first set of SBFD symbols or slots and may operate according to a half-duplex mode in a second set of SBFD symbols or slots. For example, a second UE may have high priority traffic, such that a network entity may allocate (e.g., re-allocate) uplink resources or downlink resources of an SBFD symbol or slot of the second set of SBFD symbols or slots to the second UE. As such, the network entity may transmit control signaling indicating whether the SBFD capable UE is allocated both uplink resources and downlink resources for an SBFD symbol or slot (e.g., the SBFD capable UE may operate according to the SBFD mode) or either the uplink resources or the downlink resources for the SBFD symbol or slot (e.g., the SBFD capable UE may operate according to the half-duplex mode).

Aspects of the disclosure are initially described in the context of wireless communications systems. Aspects of the disclosure are then described in the context of a timing diagram and a process flow. Aspects of the disclosure are further illustrated by and described with reference to apparatus diagrams, system diagrams, and flowcharts that relate to techniques for UE SBFD operation.

FIG. 1 shows an example of a wireless communications system 100 that supports techniques for UE SBFD operation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for UE SBFD operation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a UE 115 of the wireless communications systems 200 may be capable of operating according to an SBFD mode, which may be referred to as an SBFD capable UE 115. In such cases, according to a first rule, the SBFD capable UE 115 may interpret configuration information indicating both uplink resources and downlink resources for an SBFD symbol or slot as being allocated to the SBFD capable UE 115. As such, the SBFD capable UE 115 may operate according to the SBFD mode, in which the UE 115 may be referred to as an SBFD UE 115, and a network entity 105 may operate according to the SBFD mode, in which the network entity 105 may be referred to as an SBFD network entity 105. Additionally, a second rule may define that a UE 115 operating according to a half-duplex mode, which may be referred to as a half-duplex UE 115, may interpret configuration information indicating both uplink resources and downlink resources of an SBFD symbol or slot as allocating either the uplink resources or the downlink resources to the half-duplex UE 115. As such, the half-duplex UE 115 may operate according to the half-duplex mode and the network entity 105 may operate according to the SBFD mode (e.g., with another UE 115), in which the network entity may be an SBFD network entity 105.

Additionally, or alternatively, in some cases, an SBFD capable UE 115 may operate according to an SBFD mode in a first set of SBFD symbols or slots and may operate according to a half-duplex mode in a second set of SBFD symbols or slots. For example, a second UE 115 may have high priority traffic, such that a network entity 105 may allocate (e.g., re-allocated) uplink resources or downlink resources of an SBFD symbol or slot of the second set of SBFD symbols or slots to the second UE 115. As such, the network entity 105 may transmit control signaling indicating whether the SBFD capable UE 115 is allocated both uplink resources and downlink resources for an SBFD symbol or slot (e.g., the SBFD capable UE 115 may operate according to the SBFD mode) or either the uplink resources or the downlink resources for the SBFD symbol or slot (e.g., the SBFD capable UE 115 may operate according to the half-duplex mode).

Figure 2:
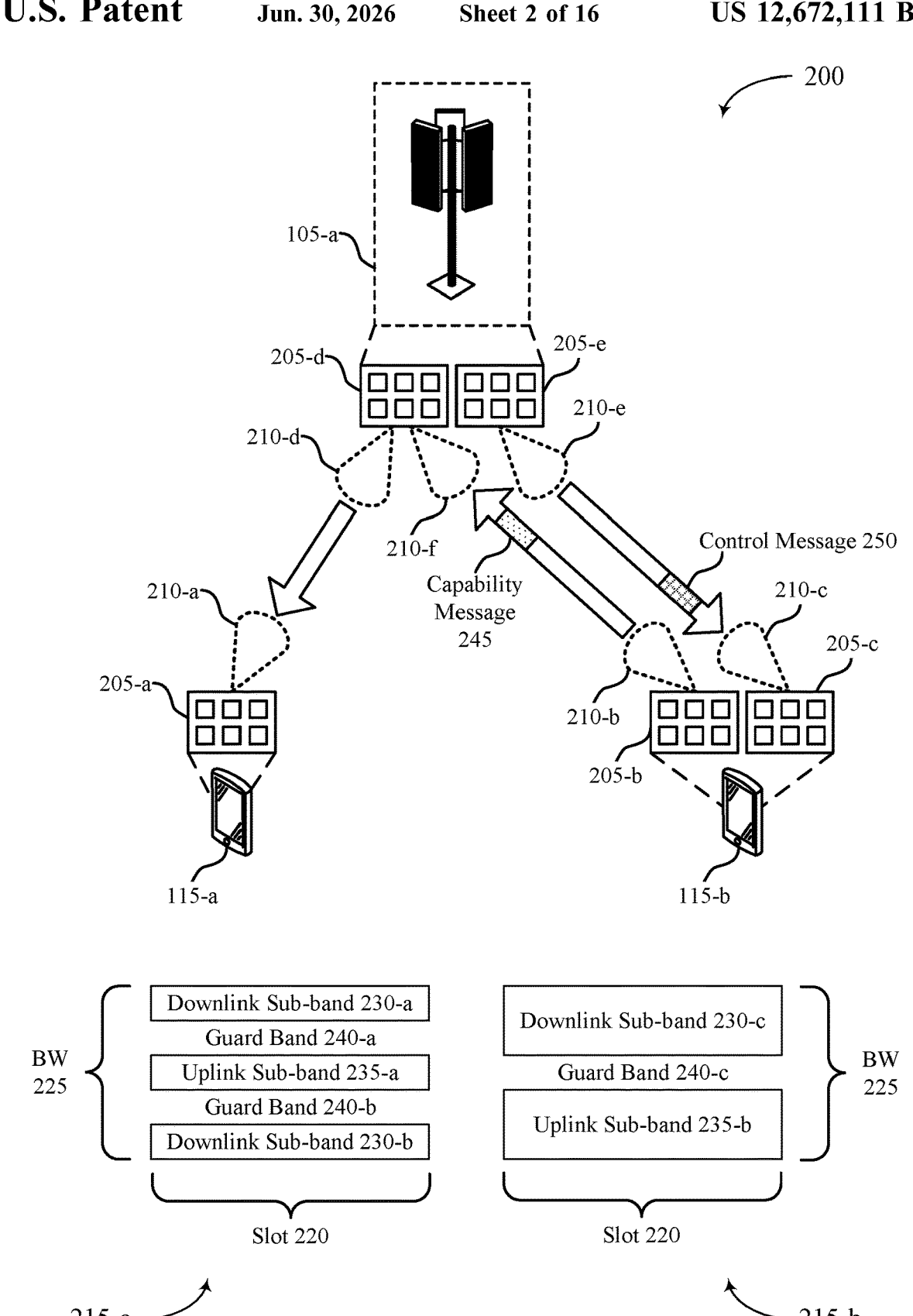
FIG. 2 shows an example of a wireless communications system that supports techniques for UE SBFD operation in accordance with one or more aspects of the present disclosure.

FIG. 2 shows an example of a wireless communications system 200 that supports techniques for UE SBFD operation in accordance with one or more aspects of the present disclosure. In some examples, the wireless communications system 200 may implement or be implemented by aspects of the wireless communications system 100. For example, the wireless communications system 200 may include one or more network entities 105 (e.g., a network entity 105-a) and one or more UEs 115 (e.g., a UE 115-a and a UE 115-b), which may be examples of the corresponding devices described herein with reference to FIG. 1.

In some wireless communications systems, such as the wireless communications system 200, a network entity 105, such as the network entity 105-a, may be capable of operating according to an SBFD mode. In such cases, the network entity 105-a may configure one or more slots 220 (e.g., or symbols) of a CC with both uplink resources (e.g., one or more uplink sub-bands 235) and downlink resources (e.g., one or more downlink sub-bands 230). In such cases, the slot 220 may be referred to as an SBFD slot 220. For example, the network entity 105-a may configure an slot 220 associated with a bandwidth (BW) 225 (e.g., of the CC) according to an SBFD pattern 215-a, such that the slot 220 supports a downlink sub-band 230-a, an uplink sub-band 235-a, and a downlink sub-band 230-b (D+U+D), where the downlink sub-band 230-a and the uplink sub-band 235-a are separated by a guard band 240-a and the uplink sub-band 235-a and the downlink sub-band 230-b are separated by a guard band 240-b. In another example, the network entity 105-a may configure the slot 220 associated with the BW 225 according to an SBFD pattern 215-b, such that the slot 220 supports a downlink sub-band 230-c and an uplink sub-band 235-b (D+U), where the downlink sub-band 230-c and the uplink sub-band 235-b are separated by a guard band 240-c. In some examples, a size of one or more guard bands 240 in a slot 220 may be based on a configuration of the slot 240. For example, each guard band 240 of a slot 220 may be associated with a quantity of resource blocks (RBs), such that the network entity 105-a may configure the quantity of resource blocks in the slot 220 (e.g., and indicate the quantity to a UE 115). As such, the network entity 105-a may simultaneously communicate with a first UE 115, such as the UE 115-*a*, via the downlink sub-band(s) 230 and with a second UE 115, such as the UE 115-*b*, via the uplink sub-band(s) 235 in a same slot 220.

In some examples, the network entity 105-*a* may support SBFD in a TTD carrier (e.g., CC) or in intra-band CA. In such cases, as described with reference to the SBFD patterns 215, the network entity 105-*a* may support simultaneous transmission and reception of downlink and uplink communications, respectively, on a sub-band basis. In some examples, the network entity 105-*a*, operating according to the SBFD mode, may increase an uplink duty cycle, which may increase uplink coverage and decrease latency (e.g., it is possible to transmit uplink signals in an uplink sub-band 235 in a downlink only or flexible slots 220 or receive downlink signals in downlink sub-band(s) 230 in legacy only uplink slots 220). Additionally, or alternatively, the network entity 105-*a*, operating according to the SBFD mode, may enhance system capacity, enhance resource utilization, enhance spectrum efficiency, and enable flexible and dynamic uplink and downlink resource adaption according to uplink and downlink traffic (e.g., in a robust manner), another other advantages.

In some examples, a UE 115, such as the UE 115-*b*, may be capable of operating according to an SBFD mode. In other words, the UE 115-*b* may simultaneously communicate with one or more network entities 105 (e.g., cells) via downlink sub-band(s) 230 and via uplink sub-band(s) 235 in a same slot 220. In some cases, the UE 115-*b* may simultaneously communicate with a single network entity 105, such as the network entity 105-*a*, via the downlink sub-band (s) 230 and via the uplink sub-band(s) 235 in the same slot 220. Similarly (e.g., due to the SBFD capabilities of the UE 115-*b*), the network entity 105-*a* may simultaneously communicate with a single UE 115, such as the UE 115-*b*, via downlink sub-band(s) 230 and via uplink sub-band(s) 235 in a same slot 220. Conversely, the network entity 105-*a* may simultaneously communicate with a first UE 115, such as the UE 115-*a*, via the downlink sub-band(s) 230 and with a second UE 115, such as the UE 115-*b*, via the uplink sub-band(s) 235 in the same slot 220.

As such, the UE 115-*b* (e.g., a UE 115 capable of operating according to an SBFD mode), which may be referred to as an SBFD capable UE 115-*b*, and the network 105-*a* (e.g., a network entity 105 capable of operating according to an SBFD mode), which may be referred to as an SBFD capable network entity 105-*a*, may support multiple communication modes. As described herein, a half-duplex wireless device (e.g., half-duplex mode wireless device), such as a half-duplex UE 115 or a half-duplex network entity 105, may refer to the wireless device operating according to a half-duplex mode, such as a UE half-duplex mode or a network entity half-duplex mode, respectively. Similarly, an SBFD wireless device (e.g., SBFD mode wireless device), such as an SBFD UE 115 or an SBFD network entity 105, may refer to the wireless device operating according to an SBFD mode, such as a UE SBFD mode or a network entity SBFD mode, respectively.

In a first communication mode (e.g., half-duplex mode UE 115+half-duplex mode network entity 105), the network entity 105-*b* performs half-duplex communications with a single UE 115 in a single time-based resource (e.g., frame, sub-frame, slot). In some examples (e.g., not depicted), the network entity 105-*a* may support a half-duplex mode and may not support an SBFD mode. In some examples, within a single time-based resource (e.g., a slot) the network entity 105 may be configured to communicate with a single UE via various frequency resources. In some examples, the network entity 105-*a* may be associated with a single active antenna panel 205, such as an antenna panel 205-*d*. Additionally, the UE 115-*a* may be associated with a single active antenna panel 205-*a*, such that the UE 115-*a* may be capable of operating according to a half-duplex mode and may not be capable of operating according to an SBFD mode. As such, the network entity 105-*a* may either receive uplink communications from the UE 115-*a* or transmit downlink communications to the UE 115-*a*. For example, the network entity 105-*a* may transmit, via a beam 210-*d* from the antenna panel 205-*d*, downlink communications to the UE 115-*a*, such that the UE 115-*a* may receive the downlink communications via a beam 210-*a* from the antenna panel 205-*a*. In In a second communication mode (e.g., 2 half-duplex mode UEs 115+SBFD mode network entity 105), the network entity 105-*b* may perform SBFD communications with multiple UEs 115 in a single time-based resource (e.g., frame, sub-frame, slot). In such examples, the network entity 105-*a* may simultaneously communicate with the UE 115-*a* via the antenna panel 205-*d* and with the UE 115-*b* via an antenna panel 205-*e* in a same slot 220. For example, the network entity 105-*a* may transmit, via the beam 210-*d* from the antenna panel 205-*d*, downlink communications to the UE 115-*a*, such that the UE 115-*a* may receive the downlink communications via the beam 210-*a* from the antenna panel 205-*a*. Simultaneously (e.g., during a same slot 220), the network entity 105-*a* may receive, via a beam 210-*e* from an antenna panel 205-*e*, uplink communications transmitted by the UE 115-*b* via a beam 210-*c* from an antenna panel 205-*e*. In such cases, slots 220 (e.g., or symbols) may be configured (e.g., by the network entity 105-*a*) as SBFD slots 220 (e.g., network entity 105-*a* slots 220) in which the slots 220 supports uplink communication and downlink communications by the network entity 105-*a*. In some examples, the first communication mode and the second communication mode may co-exist, such that some slots 220 may be configured as half-duplex slots and some slots 220 may be configured as SBFDs slots 220 (e.g., network entity 105-*a* slots 220).

In a third communication mode (e.g., SBFD mode UE 115+SBFD mode network entity 105), the network entity 105-*b* may perform SBFD communications with a single SBFD capable UE 115 in a single time-based resource (e.g., frame, sub-frame, slot). In such examples, the network entity 105-*a* may simultaneously communicate with the UE 115-*b* via the antenna panel 205-*d* and via the antenna panel 205-*e* in a same slot 220. For example, the network entity 105-*a* may transmit, via the beam 210-*e* from the antenna panel 205-*e*, downlink communications to the UE 115-*b*, such that the UE 115-*b* may receive the downlink communications via the beam 210-*c* from the antenna panel 205-*c*. Simultaneously, the network entity 105-*a* may receive, via a beam 210-*f* from the antenna panel 205-*d*, uplink communications transmitted by the UE 115-*b* via a beam 210-*b* from the antenna panel 205-*b*.

In some examples, the first communication mode, the second communication mode, and the third communication mode (e.g., and any other communication modes) may co-exist. As such, a first set of slots 220 (e.g., or symbols) may be configured as half-duplex slots 220 in which the half-duplex slots 220 support either uplink communications or downlink communications (e.g., includes either downlink sub-band(s) 230 or uplink sub-band(s) 235) and a second set of slots 220 may be configured as SBFD slots 220 in which the SBFD slots 220 support uplink communications and downlink communications (e.g., includes downlink sub-band(s) 230 and uplink sub-band(s) 235). Additionally, the second set of slots 220 may include a first set of SBFD slots 220 configured to support SBFD communications by the network entity 105-*a* and the UE 115-*b* and a second set of SBFD slots 220 configured to support SBFD communications by the network entity 105-*a* and half-duplex communications by the UE 115-*a*, the UE 115-*b*, or both.

For example, for an SBFD capable UE 115-*b* (e.g., SBFD aware UE 115-*b*), the SBFD capable UE 115-*b* may be configured with an uplink sub-band 235 in an SBFD slot 220 (e.g., SBFD symbol) configured as downlink (e.g., in TDD-UL-DL-ConfigCommon), uplink transmissions within the uplink sub-band 235 may be allowed in the SBFD slot 220 and uplink transmissions outside the uplink sub-band 235 may not be allowed in the SBFD slot 220. Additionally, frequency locations of one or more downlink sub-bands 230 in the SBFD slot 220 may be known to the SBFD capable UE 115-*b*. For example, the frequency locations of one or more downlink sub-bands 230 in the SBFD slot 220 may be explicitly indicated by the network entity 105-*a* or may be implicitly derived by the UE 115-*b*. As such, downlink receptions within the one or more downlink sub-bands 230 may be allowed in the SBFD slot 220. In such case, uplink transmissions may be within an active uplink bandwidth part (BWP) in the SBFD slot 220 and downlink receptions may be within an active downlink BWP in the SBFD slot 220. However, the SBFD capable UE 115-*b* (e.g., a UE 115 capable of operating according to an SBFD mode) may receive configuration signaling for an SBFD slot 220 and may be unaware of whether the UE 115-*b* may communicate via uplink resource (e.g., uplink sub-band 235), downlink resources (e.g., one or more downlink sub-bands 230), or both.

Accordingly, the wireless communications system 200 may support techniques to enable UEs 115 to interpret configuration information for an SBFD slot 220. For example, wireless devices of the wireless communications system 200 (e.g., the UE 115-*a*, the UE 115-*b*, and the network entity 105-*a*) may adhere to one or more rules for interpreting configuration information. In such cases, the one or more rules may be associated with an SBFD capable UE 115, such as the UE 115-*b*, operating (e.g., always operating) in an SBFD mode (e.g., a UE SBFD mode) and being associated with (e.g., always having) at least two separate active antenna panels 205, such as the antenna panel 205-*b* and the antenna panel 205-*c*. For example, a first rule may define than an SBFD capable UE 115, such as the UE 115-*b*, may interpret configuration information (e.g., a control message 250 indicating a configuration of an SBFD slot 220, DL/UL sub-band configuration signaling) indicating both uplink resources (e.g., one or more uplink sub-bands 235) and downlink resources (e.g., one or more downlink sub-bands 230) for an SBFD slot 220 as being allocated to the UE 115-*b*. In other words, the UE 115-*b* may assume that the UE 115-*b* and the network entity 105-*a* may operate according to the third communication mode (e.g., SBFD mode UE 115+SBFD mode network entity 105) in which the UE 115-*b* may simultaneously receive downlink communications via the downlink resources of the SBFD slot 220 and transmit uplink communications via the uplink resources of the SBFD slot 220. As such, the network entity 105-*a* may transmit downlink communications to the UE 115-*b* via the downlink resources of the SBFD slot 220 and receive uplink communications from the UE 115-*b* via the uplink resources of the SBFD slot 220 based on transmitting the configuration information indicating both the uplink resources and the downlink resources for the SBFD slot 220 to the UE 115-*b*. In other words, the UE 115-*b* may operate with same downlink sub-band(s) 230 and same uplink sub-band(s) 235 as the network entity 105-*a*.

Additionally, or alternatively, a second rule may define that a UE 115 not capable of operating according to an SBFD mode, or capable of operating according to a half-duplex mode, such as the UE 115-*a*, may interpret configuration information indicating either uplink resources (e.g., one or more uplink sub-bands 235) or downlink resources (e.g., one or more downlink sub-bands 230) for an SBFD slot 220 as either the uplink resources or the downlink resources being allocated to the UE 115-*a*. In other words, the UE 115-*a* may assume that the UE 115-*a* and the network entity 105-*a* may operate according to the second communication mode (e.g., half-duplex mode UE 115+SBFD mode network entity 105) in which the UE 115-*a* may either receive downlink communications via the downlink resources of the SBFD slot 220 or transmit uplink communications via the uplink resources of the SBFD slot 220 based on the configuration information. As such, the network entity 105-*a* may either transmit downlink communications to the UE 115-*a* via the downlink resources of the SBFD slot 220 or receive uplink communications from the UE 115-*a* via the uplink resources of the SBFD slot 220 based on transmitting the configuration information indicating either the uplink resources or the downlink resources for the SBFD slot 220 to the non-SBFD capable UE 115-*a*.

In some examples, a UE 115 (e.g., the UE 115-*a*, the UE 115-*b*, or both) may transmit a capability message 245 indicating whether the UE 115 supports operations in accordance with an SBFD mode (e.g., a capability of the UE 115 to support SBFD UE operation). For example, the UE 115-*a* may transmit a capability message 245 indicating the UE 115-*a* is not an SBFD capable UE 115 (e.g., the UE 115-*a* supports operations in accordance with a half-duplex mode, does not support operations in accordance with the SBFD mode). Conversely, the UE 115-*b* may transmit a capability message 245 indicating the UE 115-*b* is an SBFD capable UE 115 (e.g., the UE 115-*b* supports operations in accordance with the SBFD mode). In some examples, the indication of whether the UE 115 supports operations in accordance with an SBFD mode (e.g., SBFD UE capability) may be generalized to partial or fully overlapping full-duplex capabilities of the UE 115. In other words, the capability message 245 may indicate whether the UE 115 supports SBFD communications, partially overlapping full-duplex communications, fully overlapping full-duplex communications, or any combination thereof, from a perspective of the UE 115 (e.g., supports operations in accordance with a full-duplex mode).

Though described in the context of slots 220 (e.g., SBFD slots 220), this is not to be regarded as a limitation of the techniques described herein. In this regard, the techniques described herein may be applied to one or more symbols (e.g., SBFD symbols), one or more slots 220 (e.g., SBFD slots 220), or both.

Figure 3:
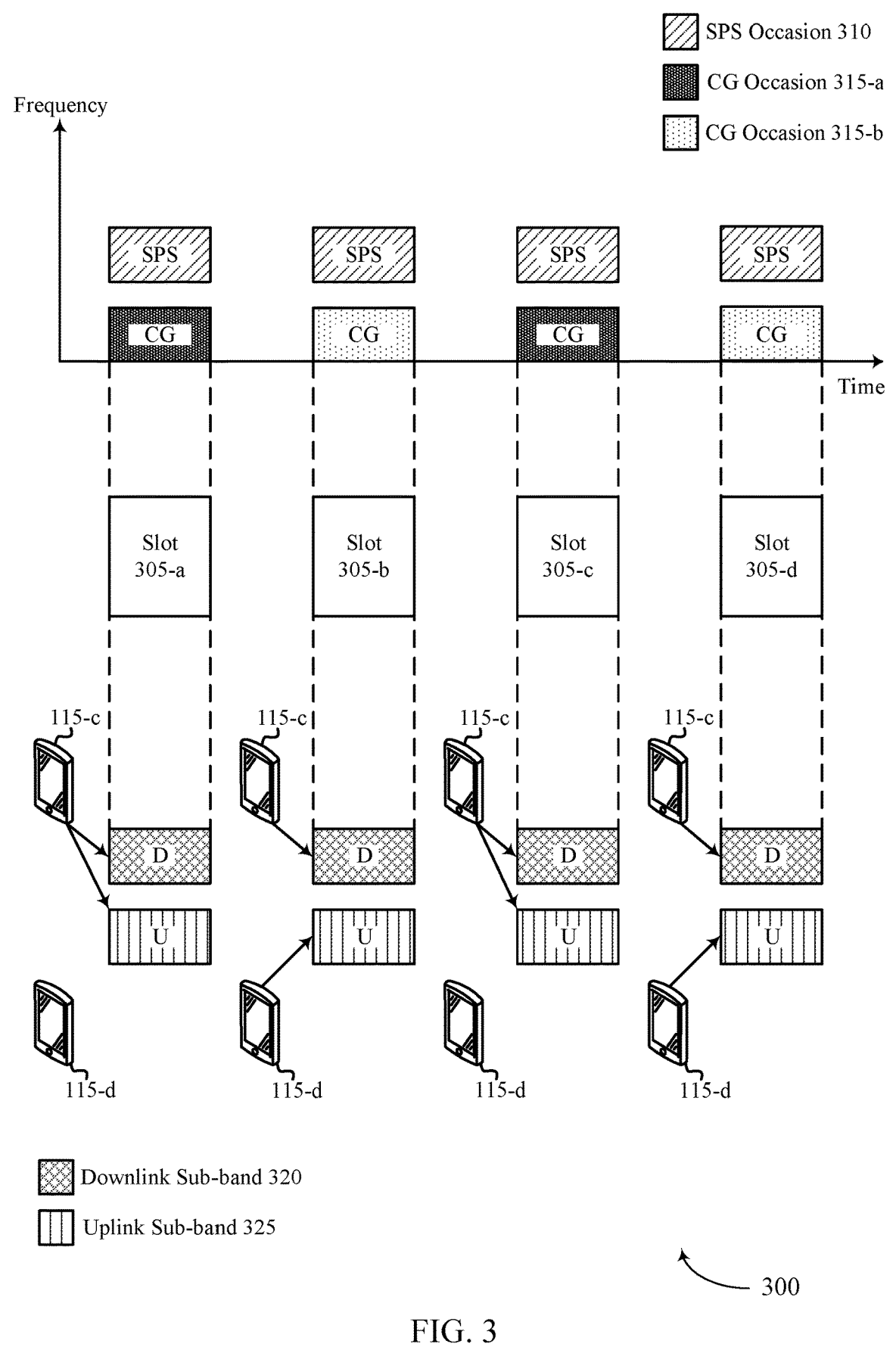

FIG. 3 shows an example of a timing diagram 300 that supports techniques for UE SBFD operation in accordance with one or more aspects of the present disclosure. In some examples, the timing diagram 300 may implement or be implemented by aspects of the wireless communications system 100, the wireless communications system 200, or both. For example, the timing diagram 300 may include one or more network entities 105 and one or more UEs 115 (e.g., a UE 115-*c* and a UE 115-*d*), which may be examples of the corresponding devices described herein with reference to FIG. 1.

As described herein, a UE 115, such as the UE 115-*c*, may be capable of operating according to an SBFD mode. In other words, the UE 115-*c* may simultaneously communicate with one or more network entities 105 via downlink sub-band(s) 320 and via uplink sub-band(s) 325 in a same slot 305, which may be referred to as an SBFD slot 305. As such, the UE 115-*c* (e.g., a UE 115 capable of operating according to an SBFD mode), which may be referred to as an SBFD capable UE 115-*c*, and a network entity 105 (e.g., a network entity 105 capable of operating according to an SBFD mode), which may be referred to as an SBFD capable network entity 105, may support multiple communication modes, such as the first communication mode, the second communication mode, and the third communication mode, as described with reference to FIG. 2.

However, even though the UE 115-*c* may be capable of operating according to the SBFD mode, the network entity 105 may not configure an SBFD slot 305 (e.g., symbol) for SBFD communications with the UE 115-*c* (e.g., the network entity 105 may not need to configure an SBFD UE 115 on all symbols or slots all the time). In other words, the network entity 105 may configure an SBFD slot 305 with both uplink resources (e.g., one or more uplink sub-bands 325) and downlink resources (e.g., one or more downlink sub-bands 320), however, the network entity 105 may communicate with the SBFD capable UE 115-*c* via either the uplink resources or the downlink resources (e.g., not both), such that the SBFD capable UE 115-*c* operates according to a half-duplex mode (e.g., the SBFD capable UE 115-*c* may not always operate according to an SBFD mode). As such, the resources (e.g., the uplink resources or the downlink resources) not used to communicate with the SBFD capable UE 115-*c* in the SBFD slot 305 may be used communicate with a second UE 115, such as the UE 115-*d* (e.g., another SBFD capable UE 115 or a half-duplex UE 115).

In such cases, the network entity may determine to re-allocate resources from the SBFD capable UE 115-*c* to the UE 115-*d* (e.g., non-SBFD capable UE 115) based on one or more conditions. For example, the network entity may determine to re-allocate resources from the UE 115-*c* to the UE 115-*d* based on a capability of the UE 115-*c*. That is, a capability of the UE 115-*c* to operate according to the SBFD mode may be conditional, dynamic, or both, such that the UE 115-*c* may operate according to the half-duplex mode in a first set of slots 305 and according to the SBFD mode in a second set of slots 305 (e.g., based on the capability of the UE 115-*c*). For example, the UE 115-*c* may operate according to the SBFD mode and self-interference at the UE 115-*c* may exceed a threshold value (e.g., become very high). As such, the UE 115-*c* may request, indicate, or both, to the network entity 105 to switch to communicating with the UE 115-*c* according to a half-duplex mode (e.g., allow the UE 115-*c* to switch to a half-duplex mode due to clutter). Additionally, or alternatively, the network entity 105 may determine to re-allocate resources from the UE 115-*c* to the UE 115-*d* based on a threshold quantity of resources (e.g., for fairness or scheduling). That is, the network entity 105 may communicate (e.g., pair) with the UE 115-*d* (e.g., for network entity SFBD operation), such that the UE 115-*c* and the UE 115-*d* are each allocated the threshold quantity of resources.

Additionally, or alternatively, the network entity 105 may determine to re-allocate resources from the UE 115-*c* to the UE 115-*d* based on a traffic demand of the UE 115-*c*, the UE 115-*d*, or both, per downlink or uplink. For example, the UE 115-*c* may be associated with dominant traffic in a first direction (e.g., downlink or uplink), such that the network entity 105 may communicate with the UE 115-*d* in a second direction (e.g., uplink or downlink, respectively). In other words, the UE 115-*c* and the UE 115-*d* may each operate according to a half-duplex mode (e.g., UE half-duplex mode) while the network entity 105 operates according to an SBFD mode (e.g., network entity SFBD operation). Similarly, the UE 115-*d* may be associated with urgent traffic (e.g., higher priority traffic) to communicate, such that the network entity 105 may re-allocate resources from the UE 115-*c* to the UE 115-*d* so the UE 115-*d* may communicate the urgent traffic.

Additionally, or alternatively, the UE 115-*c* may be associated with periodic communications, where a periodicity of a first signal is greater than a periodicity of a second signal, such that the network entity 105 may re-allocate resources from the UE 115-*c* to the UE 115-*d* for communications associated with a same periodicity as the second signal. For example, as depicted in FIG. 3, the UE 115-*c* may be associated with periodic transmissions via configured grants (CG) occasions 315-*a* and periodic receptions via semi-persistent scheduling (SPS) occasions 310. In such cases, the CG occasions 315-*a* may be associated with a first periodicity and the SPS occasions 310 may be associated with a second periodicity, where the first periodicity is greater than the second periodicity. Additionally, the UE 115-*d* may be associated with periodic transmissions via CG occasions 315-*b* associated with the second periodicity. As such, the network entity may re-allocate resources from the UE 115-*c* to the UE 115-*d* for the CG occasions 315-*b*.

For example, the network entity 105 may configure a set of SBFD slots 305, including an SBFD slot 305-*a*, an SBFD slot 305-*b*, an SBFD slot 305-*c*, and an SBFD slot 305-*d*, where each SBFD slot 305 includes an uplink sub-band 325 and a downlink sub-band 320. The first periodicity associated with the SPS occasions 310 may be such that the network entity 105 allocates the downlink sub-band 320 in each SBFD slot 305 to the UE 115-*c*. Conversely, the second periodicity associated with the CG occasions 315-*a* (e.g., and the CG occasions 315-*b*) may be such that the network entity 105 allocates the uplink sub-band 325 in every other SBFD slot 305 to the UE 115-*c*. For example, the network entity 105 may allocate the uplink sub-band 325 in the SBFD slot 305-*a* and the uplink sub-band in the SBFD slot 305-*c*. As such, the network entity 105 may allocate the uplink sub-band 325 in the slot 305-*b* and the uplink sub-band 325 in the slot 305-*d* to the UE 115-*d* for the CG occasions 315-*b*. In other words, the SBFD capable UE 115-*c* may operate according to an SBFD mode (e.g., UE SBFD mode) in the SBFD slot 305-*a* and the SBFD slot 305-*c* and may operate according to a half-duplex mode in the SBFD slot 305-*b* and the SBFD slot 305-*d*.

However, signaling that indicates whether a slot 305 is an SBFD slot 305 (e.g., configuration signaling) may not be sufficient for the UE 115-*c* to differentiate between the half-duplex mode and the SBFD mode. That is, the network entity 105 may transmit configuration information indicating a configuration of the SBFD slots 305 (e.g., indicating both uplink resources and downlink resources) and the UE 115-*c* may assume both the uplink resources and the downlink resources of each SBFD slot 305 are allocated to the UE 115-*c*. As such, the UE 115-*c* may attempt to transmit signaling in uplink resources not allocated to the UE 115-*c* or may attempt to receive signaling in downlink resources not allocated to the UE 115-*c*. For example, in the context of FIG. 3, the UE 115-*c* may attempt to transit uplink communications in the SBFD slot 305-*c* and the SBFD slot 305-*d*, which may result in interference with communications by the UE 115-d in the SBFD slot 305-c and the SBFD slot 305-d.

Additionally, or alternatively, the UE 115-c may be associated with different antenna configurations for each mode (e.g., the SBFD mode and the half-duplex mode). For example, the UE 115-c may use a full antenna array for communicating with the SBFD network entity 105 while the UE 115-c operates according to the half-duplex mode and may split the full antenna array into two separate antenna arrays (e.g., panels) for communicating with the SBFD network entity 105 while the UE 115-c operates according to the SBFD mode. Additionally, or alternatively, the network entity 105 may configure the UE 115-c operating according to the SBFD mode with two TCI states for a paired downlink and uplink transmission, where the two TCI states are different TCI states than those configured for the UE 115-c when the UE 115-c operates according to the half-duplex mode. Additionally, or alternatively, operation parameters (e.g., uplink transmission power, modulation and coding scheme (MCS), timing, beam, or the like thereof) may be different for the UE 115-c operating according to the half-duplex mode than for the UE 115-c operating according to the SBFD mode. Additionally, or alternatively, an RF may retune if it is different for the for the UE 115-c operating according to the half-duplex mode than for the UE 115-c operating according to the SBFD mode (e.g., an additional filter may be used for UE SBFD mode for self-interference mitigation). Additionally, or alternatively, the UE 115-c operating according to the SBFD mode may be associated with a different sub-band frequency or pattern compared with UE 115-c operating according to the half-duplex mode. As such, the UE 115-c may attempt to communicate according to an SBFD mode during an SBFD slot 305, however, the network entity 105 may be expecting the UE 115-c to operate according to a half-duplex mode in the SBFD slot 305, resulting in failed communications due to the different parameters, configurations, or the like thereof, associated with each mode.

Accordingly, techniques described herein may enable the network entity 105 to indicate, to the UE 115-c (e.g., the SBFD capable UE 115-c), whether an SBFD slot 305 may support SBFD communications by the UE 115-c (e.g., SBFD mode network entity 105+SBFD mode UE 115-c) or half-duplex communications by the UE 115-c (e.g., SBFD mode network entity 105+half-duplex mode UE 115-c). In other words, the network entity 105 may indicate, on the SBFD slot 305 (e.g., network entity 105 SBFD slot 305 or symbol), whether an SBFD slot 305 supports SBFD communications by the UE 115-c (e.g., in accordance with the third communication mode) or half-duplex communications by the UE 115-c (e.g., in accordance with the second communication mode). In some examples, the network entity 105 may indicate a configuration of an SBFD slot 305 via one or more bits in a control message. For example, 2 bits may be associated with each SBFD slot 305 (e.g., or symbol), where a value of 00 indicates both the UE 115-c and the network entity 105 may operate according to half-duplex modes (e.g., in accordance with the first communication mode), a value of 01 indicates the UE 115-c may operate according to a half-duplex mode and the network entity 105 may operate according to an SBFD mode (e.g., in accordance with the second communication mode), a value of 10 indicates both the UE 115-c and the network entity 105 may operate according to SBFD modes (e.g., in accordance with the third communication mode), and a value of 11 may indicate the UE 115-c may operate according to an SBFD mode with multiple network entities 105 (e.g., multi-TRP) and the network entity 105 may operate according to a half-duplex mode (e.g., not depicted with reference to FIG. 2). Additionally, or alternatively, the indication may be associated with a pattern. That is, the indication may include a periodic pattern identifier (e.g., pattern identification), where the periodic pattern identifier is from a set of periodic pattern identifiers (e.g., pre-configured), and where each periodic pattern identifier indicates a configuration of each SBFD slot 305 of a set of SBFD slots 305.

In some examples, the indication may be a semi-static indication (e.g., via RRC message). For example, the network entity 105 may include the indication in a first control message indicating a configuration of one or more SBFD slots 305 (e.g., semi-static network entity 105 SBFD time indication). Additionally, or alternatively, the network entity 105 may include the indication in a second control message (e.g., after the first control message). In some other examples, the indication may be a semi-persistent indication or a dynamic (e.g., aperiodic) indication. In such cases, the network entity 105 may transmit a MAC-CE message, a DCI message (e.g., Group Common DCI, DCI not scheduling data) or both, including the indication. In some examples, the DCI message may be a scheduling DCI message, a non-scheduling DCI message, a group common DCI message, or any combination thereof.

Though described in the context of slots 305 (e.g., SBFD slots 305), this is not to be regarded as a limitation of the techniques described herein. In this regard, the techniques described herein may be applied to one or more symbols (e.g., SBFD symbols), one or more slots 305 (e.g., SBFD slots 305), or both.

Figure 4:
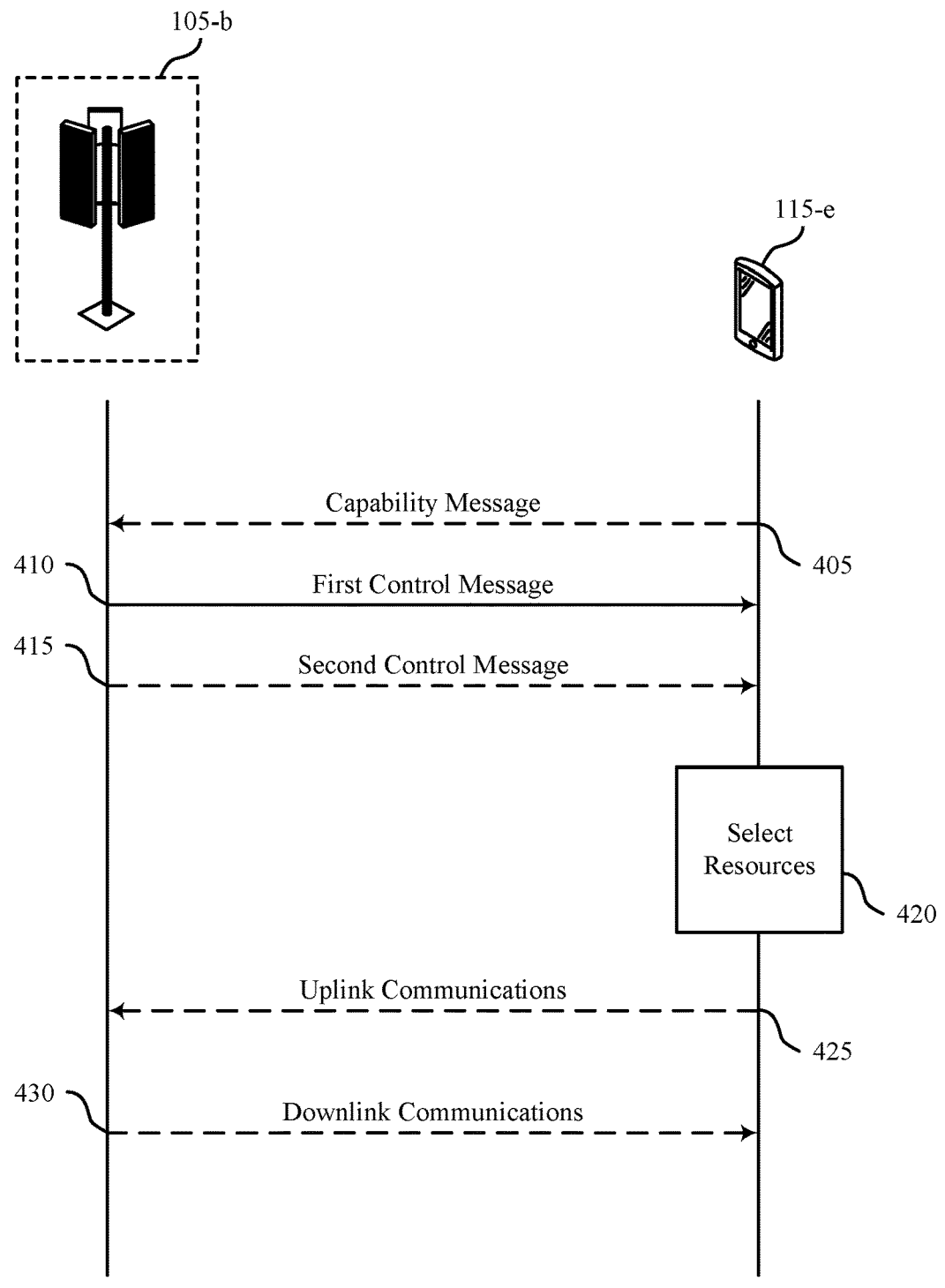
FIG. 4 shows an example of a process flow that supports techniques for UE SBFD operation in accordance with one or more aspects of the present disclosure.

FIG. 4 shows an example of a process flow 400 that supports techniques for UE SBFD operation in accordance with one or more aspects of the present disclosure. In some examples, the process flow 400 may implement or be implemented by aspects of the wireless communications system 100, the wireless communications system 200, the timing diagram 300 or any combination thereof. For example, the process flow 400 may include one or more network entities 105 (e.g., a network entity 105-b) and one or more UEs 115 (e.g., a UE 115-e), which may be examples of the corresponding devices described herein with reference to FIG. 1.

In some examples, at 405, the UE 115-e may transmit, to the network entity 105-b, a capability message indicating a capability of the UE 115-e to support SBFD communications, partially overlapping full-duplex communications, fully overlapping full-duplex communications, or any combination thereof, from a perspective of the UE 115-e. In other words, the UE 115-e may indicate, to the network entity 105-b, that UE 115-e is capable of communication according to a half-duplex communication scheme and of communication according to a SBFD communication scheme (e.g., is an SBFD capable UE 115, supports a half-duplex mode and an SBFD mode).

At 410, the UE 115-e may receive, from the network entity 105-b, a first control message indicating configuration information associated with one or more SBFD symbols or slots (e.g., SBFD symbols or slots from the perspective of the network entity 105-b), where the configuration information indicates both first uplink resources (e.g., one or more first uplink sub-bands) and first downlink resources (e.g., one or more first downlink sub-bands) within at least one SBFD symbol or slot of the one or more SBFD symbols or slots.

Additionally, in some cases, the first control message (e.g., configuration information) may further indicate either second uplink resources or second downlink resources within a second SBFD symbol or slot of the one or more SBFD symbols or slots. In other words, the second SBFD symbol or slot may support SBFD communications associated with the network entity 105-*b* and may support half-duplex communications associated with the UE 115-*d* (e.g., the network entity 105-*b* may operate according to an SBFD mode and the UE 115-*e* may operate according to a half-duplex mode). In some examples, the first control message may indicate a configuration of each of the one or more SBFD symbols or slots, as described further with reference to one or more second control message.

In some cases, at 415, the UE 115-*e* may receive the one or more second control messages indicating a configuration of each of the one or more SBFD symbols or slots. That is, the one or more second control messages may indicate whether an SBFD symbol or slot of the one or more SBFD symbols or slots supports half duplex communications associated with both the UE 115-*e* and the network entity 105-*b*, supports SBFD communications associated with both the UE 115-*e* and the network entity 105-*b*, supports SBFD communications associated with the network entity 105-*b* and half-duplex communications associated with the UE 115-*e*, or supports SBFD communications associated with the UE 115-*e* and half-duplex communications associated with the network entity 105-*b*. For example, the one or more second control messages may indicate the at least one SBFD symbol or slot is configured for SBFD communications associated with the UE 115-*e* and the network entity 105-*b* and indicate the second SBFD symbol or slot is configured for SBFD communications associated with the network entity 105-*b* and half-duplex communications associated with the UE 115-*e*.

In some examples, the one or more second control messages may indicate one or more durations associated with the configuration the one or more SBFD symbols or slots. For example, a first duration of the one or more durations may be associated with a first subset of the one or more SBFD symbols or slots being configured for SBFD communications associated with the UE 115-*e* and a second duration of the one or more durations may be associated with a second subset of the one or more SBFD symbols or slots being configured for half-duplex communications associated with the UE 115-*e*.

Additionally, or alternatively, the one or more second control messages may include one or more indices indicating the configuration of the one or more SBFD symbols or slots, where the one or more indices are per-SBFD symbol, per-SBFD slot, or both. For example, a first index of the one or more indices may indicate an SBFD symbol or slot of the one or more SBFD symbols or slots is configured for half-duplex communications associated with the network entity 105-*b* and associated with the UE 115-*e*, a second index of the one or more indices may indicate the SBFD symbol or slot of the one or more SBFD symbols or slots is configured for SBFD communications associated with the network entity 105-*b* and half-duplex communications associated with the UE 115-*e*, a third index of the one or more indices may indicate the SBFD symbol or slot of the one or more SBFD symbols or slots is configured for SBFD communications associated with the network entity 105-*b* and associated with the UE 115-*e*, and a fourth index of the one or more indices may indicate the SBFD symbol or slot of the one or more SBFD symbols or slots is configured for SBFD communications associated with the UE 115-*e* and half-duplex communications associated with the network entity 105-*b*.

Additionally, or alternatively, the one or more second control messages may indicate a pattern identification associated with the configuration of the one or more SBFD symbols or slots. For example, the pattern identification may indicate a first subset of the one or more SBFD symbols or slots are configured for SBFD communications associated with the UE 115-*e* and a second subset of the one or more SBFD symbols or slots are configured for half-duplex communications associated with the UE 115-*e*.

Additionally, or alternatively, the one or more second control messages (e.g., or a third control message) may indicate a first set of parameters associated with the UE 115-*e* operating according to an SBFD mode and a second set of parameters associated with the UE 115-*e* operating according to a half-duplex mode. In cases, the one or more second control messages may include an RRC message, a MAC-CE message, a DCI message, or any combination thereof. In some examples, the DCI message may be a scheduling DCI message, a non-scheduling DCI message, a group common DCI message, or any combination thereof At 420, the UE 115-*e* may select resources for communicating with the network entity 105-*b* based on a capability of the UE 115-*e*, based on the configuration of the SBFD symbols or slots, or both.

For example, in some cases, the UE 115-*e* may select both the first uplink resources and the first downlink resources for the at least one SBFD symbol or slot of the one or more SBFD symbols or slots based on a rule associated with the capability of the UE 115-*e*. That is, a rule may define than an SBFD capable UE 115 may interpret configuration information indicating both uplink resources and downlink resources as allocating both the uplink resources and the downlink resources to the SBFD capable UE 115. As such, the UE 115-*e* may determine both the first uplink resources and the first downlink resources are allocated to the UE 115-*e* for the at least one SBFD symbol or slot based on the UE 115-*e* being an SBFD capable UE 115.

Additionally, or alternatively, the UE 115-*e* may select both the first uplink resources and the first downlink resources for the at least one SBFD symbol or slot of the one or more SBFD symbols or slots based on a configuration of the at least one SBFD symbol or slot indicated in the first control message, the one or more second control messages, or both. That is, as described previously, the first control message, the one or more second control messages, or both, may indicate that the at least one SBFD symbol or slot of the one or more SBFD symbols or slots supports SBFD communications associated with the UE 115-*e* (e.g., the UE 115-*e* may operate according to the SBFD mode during the at least one SBFD symbol or slot). As such, the UE 115-*e* may select both the first uplink resources and the first downlink resources for the at least one SBFD symbol or slot of the one or more SBFD symbols or slots based on the at least one SBFD symbol or slot supporting SBFD communications associated with the UE 115-*e*.

Additionally, or alternatively, the UE 115-*e* may select either the second uplink resources or the second downlink resources for communicating with the network entity 105-*b* based on a capability of the UE 115-*e*, based on a configuration of the SBFD symbols or slots, or both. That is, as described previously, the first control message, the one or more second control messages, or both, may indicate that the second SBFD symbol or slot of the one or more SBFD symbols or slots supports half-duplex communications associated with the UE 115-e (e.g., the UE 115-e may operate according to the half-duplex mode during the at least one SBFD symbol or slot). As such, the UE 115-e may select either the second uplink resources or the second downlink resources for the second SBFD symbol or slot of the one or more SBFD symbols or slots based on the second SBFD symbol or slot supporting half-duplex communications associated with the UE 115-e.

At 425 and 430, the UE 115-e may communicate according to the selected resources. For example, during the at least one SBFD symbol or slot of the one or more SBFD symbols or slots, the UE 115-e may simultaneously transmit uplink communications (e.g., signaling) via a first antenna panel at the UE 115-e and via the first uplink resources and receive downlink communications via a second antenna panel at the UE 115-e and via the first downlink resources. In such cases, the UE 115-e may transmit the uplink communications and receive the downlink communications in accordance with the first set of parameters. Additionally, during the second SBFD symbol or slot of the one or more SBFD symbols or slots, the UE 115-e may either transmit uplink communications (e.g., signaling) via the second uplink resources or receive downlink communications via the second downlink resources. In such cases, the UE 115-e may transmit the uplink communications or receive the downlink communications in accordance with the second set of parameters.

As described herein, SBFD communications associated with a wireless device, such as the UE 115-e or the network entity 105-b, may refer to the wireless device simultaneously transmitting and receiving signaling. Conversely, half-duplex communications associated with a wireless device, such as the UE 115-e or the network entity 105-b, may refer to the wireless device either transmitting or receiving signaling. As such, SBFD communications associated with a first wireless device, such as the network entity 105-b, may include half-duplex communications associated with a second wireless device, such as the UE 115-e.

For example, the half-duplex communications associated with the second wireless device may include the second wireless device transmitting first signaling to the first wireless device. As such, the SBFD communications associated with the first wireless device may include receiving the first signaling transmitted by the second wireless device and transmitting second signaling to a third wireless device. Conversely, the half-duplex communications associated with the second wireless device may include the second wireless device receiving third signaling from the first wireless device. As such, the SBFD communications associated with the first wireless device may include transmitting the third signaling to the second wireless device and receiving fourth signaling from a third wireless device.

Figure 5:
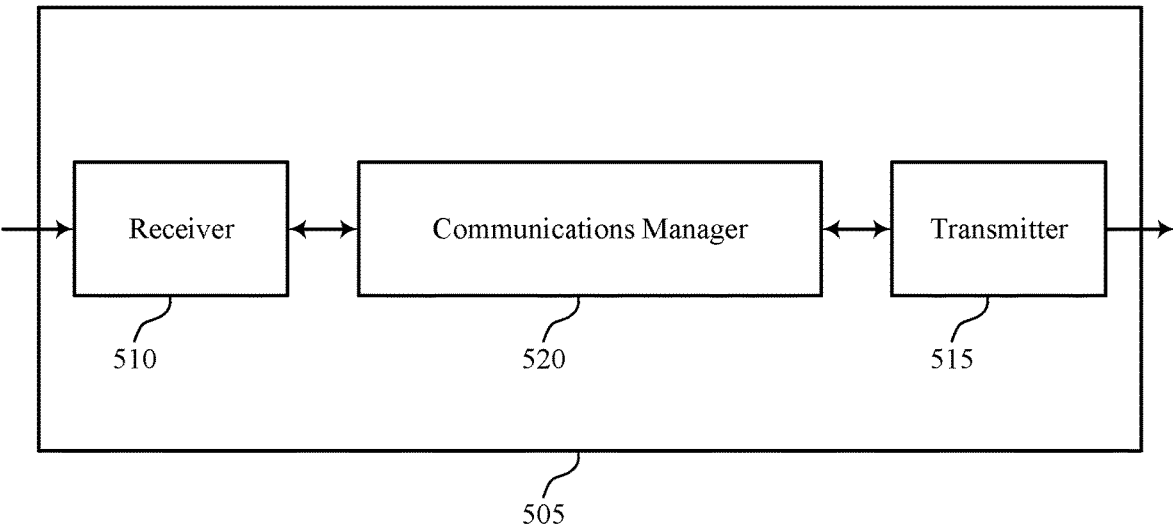
FIGS. 5 and 6 show block diagrams of devices that support techniques for UE SBFD operation in accordance with one or more aspects of the present disclosure.

FIG. 5 shows a block diagram 500 of a device 505 that supports techniques for UE SBFD operation in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for UE SBFD operation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for UE SBFD operation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for UE SBFD operation as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving a control message indicating configuration information associated with one or more SBFD symbols or slots, where the configuration information indicates both uplink resources and downlink resources within at least one SBFD symbol or slot of the one or more SBFD symbols or slots. The communications manager 520 is capable of, configured to, or operable to support a means for selecting both the uplink resources and the downlink resources for the at least one SBFD symbol or slot of the one or more SBFD symbols or slots based on a capability of the UE. The communications manager 520 is capable of, configured to, or operable to support a means for communicating via both the uplink resources and the downlink resources during the at least one SBFD symbol or slot of the one or more SBFD symbols or slots based at least in part on the selection.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for UE SBFD operations based on network entity SBFD operations, which may result in reduced processing, reduced power consumption, and more efficient utilization of communication resources, among other advantages.

Figure 6:
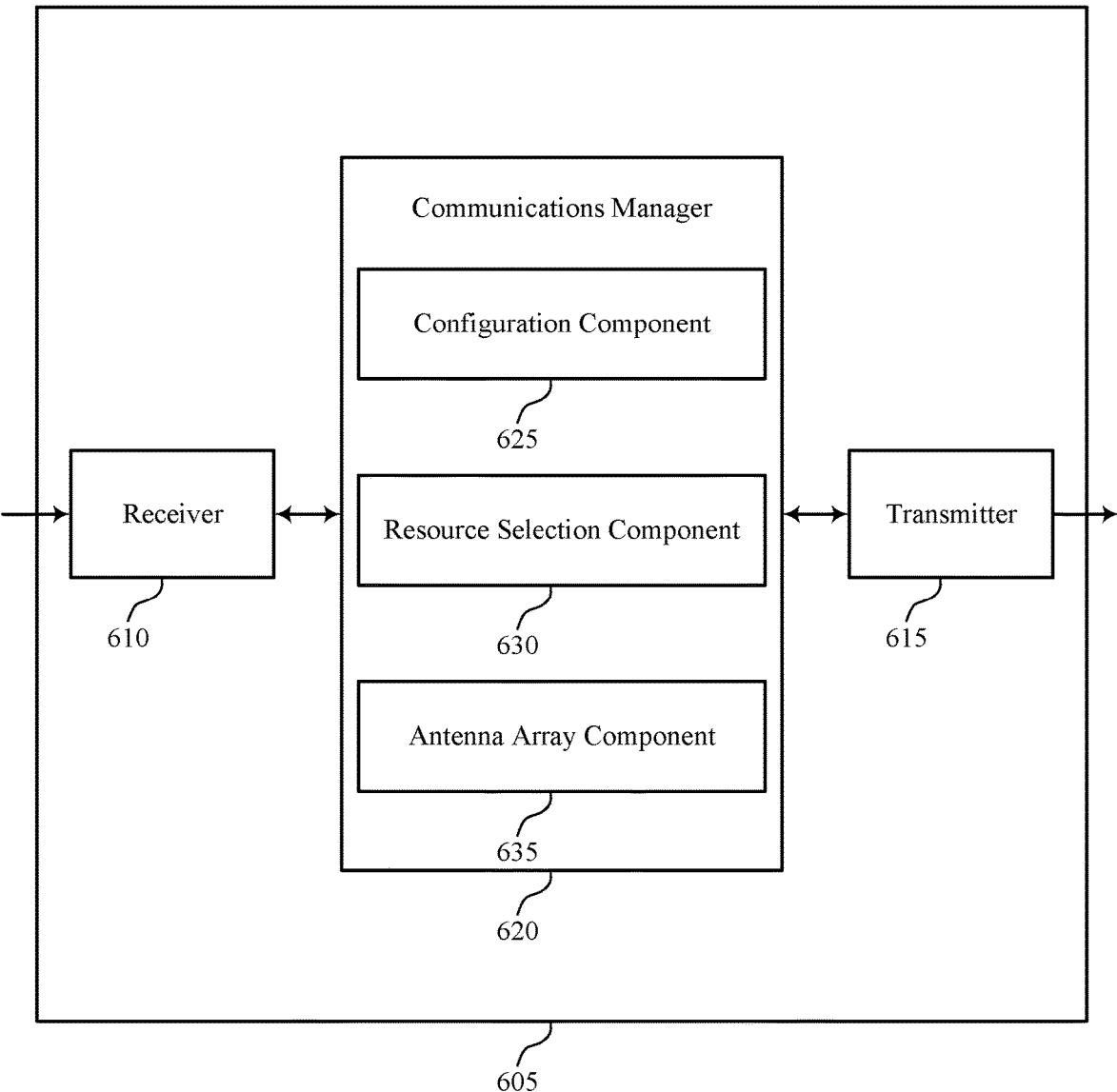

FIG. 6 shows a block diagram 600 of a device 605 that supports techniques for UE SBFD operation in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for UE SBFD operation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for UE SBFD operation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for UE SBFD operation as described herein. For example, the communications manager 620 may include a configuration component 625, a resource selection component 630, an antenna array component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The configuration component 625 is capable of, configured to, or operable to support a means for receiving a control message indicating configuration information associated with one or more SBFD symbols or slots, where the configuration information indicates both uplink resources and downlink resources within at least one SBFD symbol or slot of the one or more SBFD symbols or slots. The resource selection component 630 is capable of, configured to, or operable to support a means for selecting both the uplink resources and the downlink resources for the at least one SBFD symbol or slot of the one or more SBFD symbols or slots based on a capability of the UE. The antenna array component 635 is capable of, configured to, or operable to support a means for communicating via both the uplink resources and the downlink resources during the at least one SBFD symbol or slot of the one or more SBFD symbols or slots based on the selection.

Figure 7:
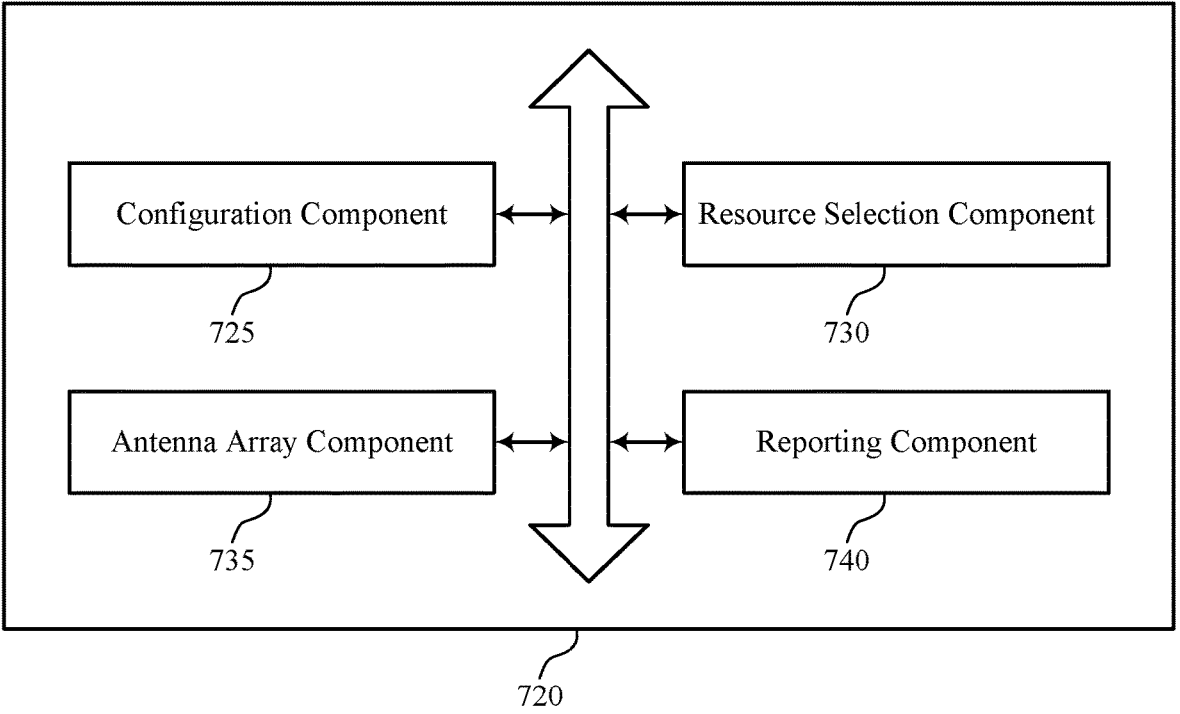
FIG. 7 shows a block diagram of a communications manager that supports techniques for UE SBFD operation in accordance with one or more aspects of the present disclosure.

FIG. 7 shows a block diagram 700 of a communications manager 720 that supports techniques for UE SBFD operation in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for UE SBFD operation as described herein. For example, the communications manager 720 may include a configuration component 725, a resource selection component 730, an antenna array component 735, a reporting component 740, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The configuration component 725 is capable of, configured to, or operable to support a means for receiving a control message indicating configuration information associated with one or more SBFD symbols or slots, where the configuration information indicates both uplink resources and downlink resources within at least one SBFD symbol or slot of the one or more SBFD symbols or slots. The resource selection component 730 is capable of, configured to, or operable to support a means for selecting both the uplink resources and the downlink resources for the at least one SBFD symbol or slot of the one or more SBFD symbols or slots based on a capability of the UE. The antenna array component 735 is capable of, configured to, or operable to support a means for communicating via both the uplink resources and the downlink resources during the at least one SBFD symbol or slot of the one or more SBFD symbols or slots based on the selection.

In some examples, the configuration information further indicates either uplink resources or downlink resources within a second SBFD symbol or slot of the one or more SBFD symbols or slots, and the resource selection component 730 is capable of, configured to, or operable to support a means for selecting either the uplink resources or the downlink resources for the second SBFD symbol or slot of the one or more SBFD symbols or slots based on the second SBFD symbol or slot supporting half-duplex communications by the UE. In some examples, the configuration information further indicates either uplink resources or downlink resources within a second SBFD symbol or slot of the one or more SBFD symbols or slots, and the antenna array component 735 is capable of, configured to, or operable to support a means for communicating via either the uplink resources or the downlink resources during the second SBFD symbol or slot based on the selection.

In some examples, the configuration component 725 is capable of, configured to, or operable to support a means for receiving one or more second control messages indicating a configuration of each of the one or more SBFD symbols or slots, where the one or more second control messages indicate the at least one SBFD symbol or slot of the one or more SBFD symbols or slots is configured for SBFD communications by the UE and the second SBFD symbol or slot of the one or more SBFD symbols or slots is configured for half-duplex communications by the UE.

In some examples, the one or more second control messages indicate one or more durations associated with the configuration the one or more SBFD symbols or slots.

In some examples, the configuration component 725 is capable of, configured to, or operable to support a means for receiving one or more third control messages indicating whether each of the one or more SBFD symbols or slots supports SBFD communications by the UE or supports half-duplex communications by the UE.

In some examples, the one or more second control messages include one or more indices indicating the configuration of the one or more SBFD symbols or slots. In such cases, the one or more indices are per-SBFD symbol, per-SBFD slot, or both.

In some examples, a first index of the one or more indices indicates an SBFD symbol or slot of the one or more SBFD symbols or slots is configured for half-duplex communications by a network entity and by the UE, a second index of the one or more indices indicates the SBFD symbol or slot of the one or more SBFD symbols or slots is configured for SBFD communications by the network entity and half-duplex communications by the UE, a third index of the one or more indices indicates the SBFD symbol or slot of the one or more SBFD symbols or slots is configured for SBFD communications by the network entity and by the UE, and a fourth index of the one or more indices indicates the SBFD symbol or slot of the one or more SBFD symbols or slots is configured for SBFD communications by the UE and half-duplex communications by the network entity.

In some examples, the one or more second control messages indicate a pattern identification associated with the configuration of the one or more SBFD symbols or slots.

In some examples, the pattern identification indicates a first subset of the one or more SBFD symbols or slots are configured for SBFD communications by the UE, a second subset of the one or more SBFD symbols or slots are configured for half-duplex communications by the UE, and one or more additional symbols or slots are configured for uplink, for downlink, are flexible, or any combination thereof.

In some examples, the one or more second control messages include an RRC message, a MAC-CE message, a DCI message, or any combination thereof. In some examples, the DCI message may be a scheduling DCI message, a non-scheduling DCI message, a group common DCI message, or any combination thereof.

In some examples, the configuration component 725 is capable of, configured to, or operable to support a means for receiving a second control message indicating a first set of parameters associated with SBFD communications by the UE and a second set of parameters associated with half-duplex communications by the UE, where communicating via both the uplink resources and the downlink resources during the at least one SBFD symbol or slot of the one or more SBFD symbols or slots is based on the first set of parameters, and where communicating via either the uplink resources or the downlink resources during the second SBFD symbol or slot of the one or more SBFD symbols or slots is based on the second set of parameters.

In some examples, the reporting component 740 is capable of, configured to, or operable to support a means for transmitting a capability message indicating a capability of the UE to support SBFD communications, partially overlapping full-duplex communications, fully overlapping full-duplex communications, or any combination thereof, from a perspective of the UE, where selecting both the uplink resources and the downlink resources is based on the capability of the UE to support SBFD communications, partially overlapping full-duplex communications, fully overlapping full-duplex communications, or any combination thereof.

In some examples, the reporting component 740 is capable of, configured to, or operable to support a means for transmitting a capability message indicating the capability of the UE to support half duplex communications from a perspective of the UE and SBFD communications from a perspective of a network entity.

In some examples, to support communicating via both the uplink resources and the downlink resources during the at least one SBFD symbol or slot of the one or more SBFD symbols or slots, the antenna array component 735 is capable of, configured to, or operable to support a means for transmitting uplink signaling via a first antenna panel at the UE and via the uplink resources during the at least one SBFD symbol or slot of the one or more SBFD symbols or slots. In some examples, to support communicating via both the uplink resources and the downlink resources during the at least one SBFD symbol or slot of the one or more SBFD symbols or slots, the antenna array component 735 is capable of, configured to, or operable to support a means for receiving downlink signaling via a second antenna panel at the UE and via the downlink resources during the at least one SBFD symbol or slot of the one or more SBFD symbols or slots.

In some examples, the uplink resources are associated with one or more uplink sub-bands and the downlink resources are associated with one or more downlink sub-bands. In some examples, the control message is associated with a network entity operating according to an SBFD mode.

Figure 8:
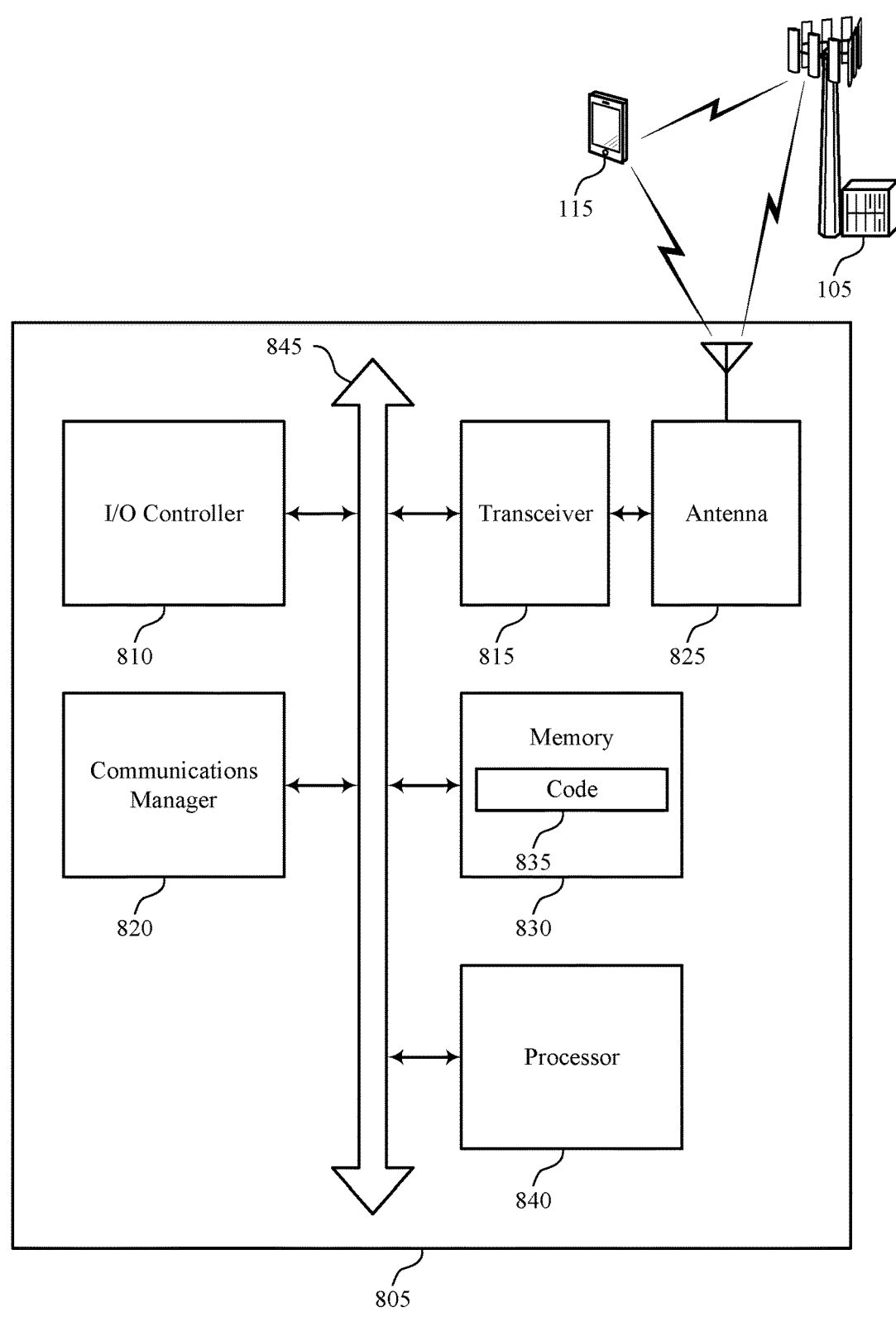
FIG. 8 shows a diagram of a system including a device that supports techniques for UE SBFD operation in accordance with one or more aspects of the present disclosure.

FIG. 8 shows a diagram of a system 800 including a device 805 that supports techniques for UE SBFD operation in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting techniques for UE SBFD operation). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving a control message indicating configuration information associated with one or more SBFD symbols or slots, where the configuration information indicates both uplink resources and downlink resources within at least one SBFD symbol or slot of the one or more SBFD symbols or slots. The communications manager 820 is capable of, configured to, or operable to support a means for selecting both the uplink resources and the downlink resources for the at least one SBFD symbol or slot of the one or more SBFD symbols or slots based on a capability of the UE. The communications manager 820 is capable of, configured to, or operable to support a means for communicating via both the uplink resources and the downlink resources during the at least one SBFD symbol or slot of the one or more SBFD symbols or slots based at least in part on the selection.

By including or configuring the communications manager 820 in accordance with examples as described herein, the device 805 may support techniques for UE SBFD operations based on network entity SBFD operations, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of techniques for UE SBFD operation as described herein, or the at least one processor 840 and the at least one memory 830 may be otherwise configured to, individually or collectively, perform or support such operations.

Figure 9:
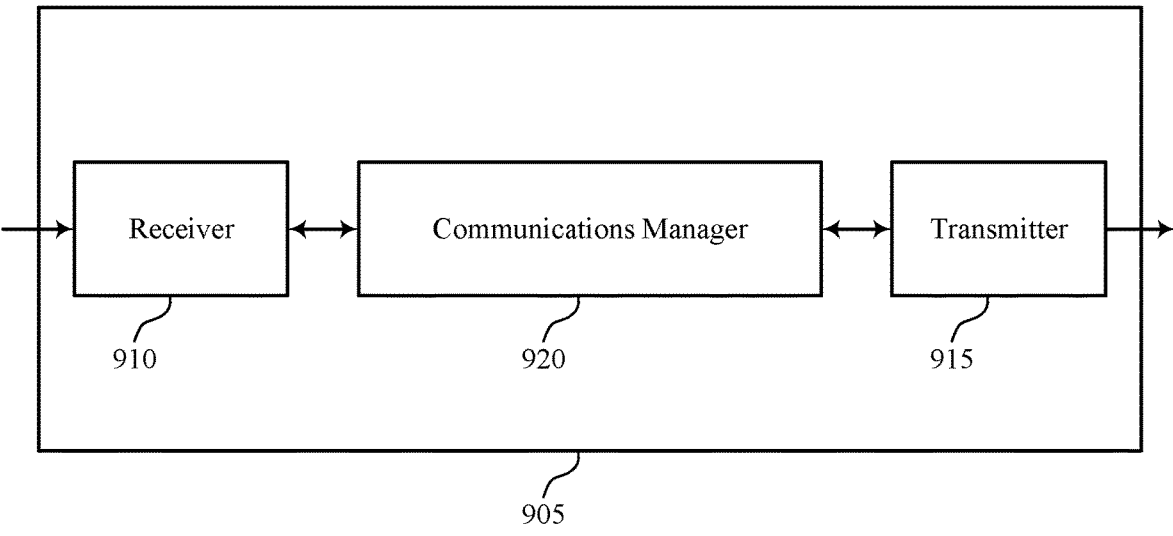
FIGS. 9 and 10 show block diagrams of devices that support techniques for UE SBFD operation in accordance with one or more aspects of the present disclosure.

FIG. 9 shows a block diagram 900 of a device 905 that supports techniques for UE SBFD operation in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for UE SBFD operation as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for transmitting a control message indicating configuration information associated with one or more SBFD symbols or slots, where the configuration information indicates both uplink resources and downlink resources within at least one SBFD symbol or slot of the one or more SBFD symbols or slots. The communications manager 920 is capable of, configured to, or operable to support a means for communicating, with a single UE, via both the uplink resources and the downlink resources during the at least one SBFD symbol or slot of the one or more SBFD symbols or slots based at least in part on a capability of the UE.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for UE SBFD operations based on network entity SBFD operations, which may result in reduced processing, reduced power consumption, and more efficient utilization of communication resources, among other advantages.

Figure 10:
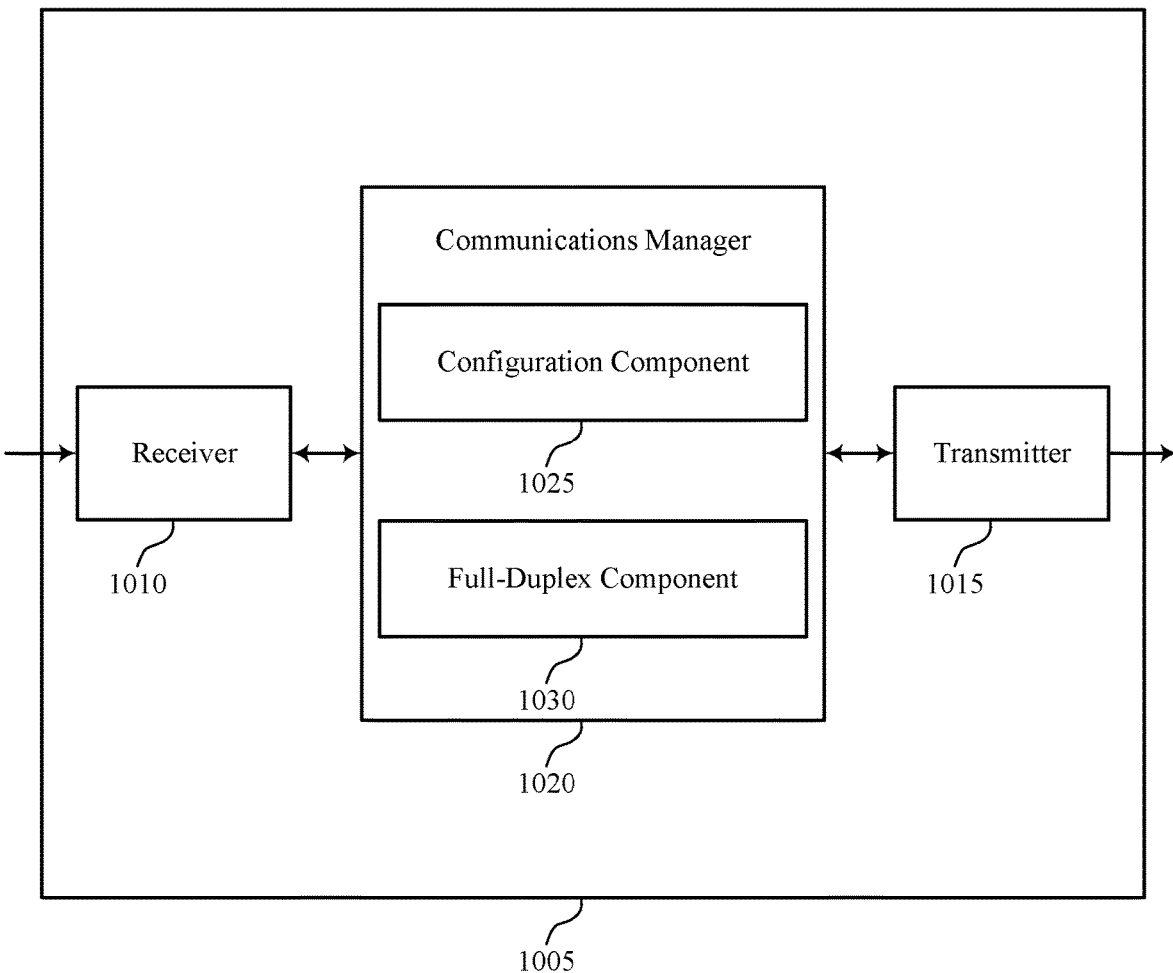

FIG. 10 shows a block diagram 1000 of a device 1005 that supports techniques for UE SBFD operation in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for UE SBFD operation as described herein. For example, the communications manager 1020 may include a configuration component 1025 a full-duplex component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The configuration component 1025 is capable of, configured to, or operable to support a means for transmitting a control message indicating configuration information associated with one or more SBFD symbols or slots, where the configuration information indicates both uplink resources and downlink resources within at least one SBFD symbol or slot of the one or more SBFD symbols or slots. The full-duplex component 1030 is capable of, configured to, or operable to support a means for communicating, with a single UE, via both the uplink resources and the downlink resources during the at least one SBFD symbol or slot of the one or more SBFD symbols or slots based on a capability of the UE.

Figure 11:
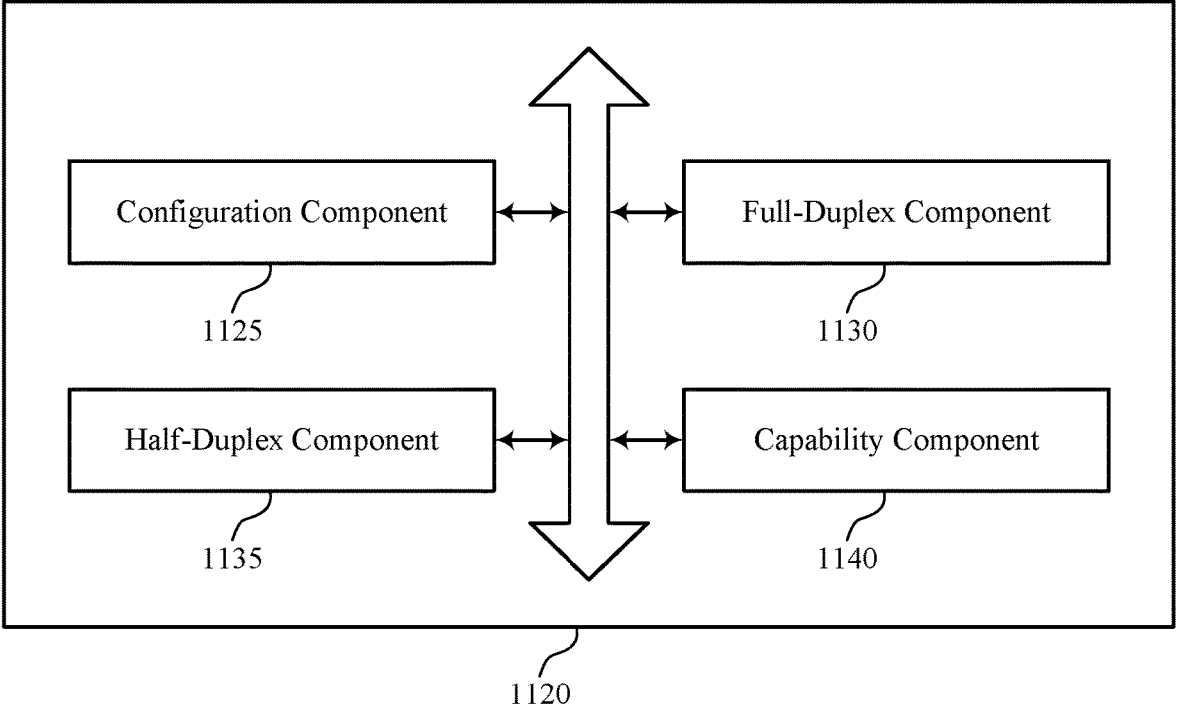
FIG. 11 shows a block diagram of a communications manager that supports techniques for UE SBFD operation in accordance with one or more aspects of the present disclosure.

FIG. 11 shows a block diagram 1100 of a communications manager 1120 that supports techniques for UE SBFD operation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for UE SBFD operation as described herein. For example, the communications manager 1120 may include a configuration component 1125, a full-duplex component 1130, a half-duplex component 1135, a capability component 1140, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The configuration component 1125 is capable of, configured to, or operable to support a means for transmitting a control message indicating configuration information associated with one or more SBFD symbols or slots, where the configuration information indicates both uplink resources and downlink resources within at least one SBFD symbol or slot of the one or more SBFD symbols or slots. The full-duplex component 1130 is capable of, configured to, or operable to support a means for communicating, with a single UE, via both the uplink resources and the downlink resources during the at least one SBFD symbol or slot of the one or more SBFD symbols or slots based on a capability of the UE.

In some examples, the configuration information further indicates either uplink resources or downlink resources within a second SBFD symbol or slot of the one or more SBFD symbols or slots, and the half-duplex component 1135 is capable of, configured to, or operable to support a means for communicating via either the uplink resources or the downlink resources during the second SBFD symbol or slot of the one or more SBFD symbols or slots based on the second SBFD symbol or slot supporting half-duplex communications by the UE.

In some examples, the configuration component 1125 is capable of, configured to, or operable to support a means for transmitting one or more second control messages indicating a configuration of each of the one or more SBFD symbols or slots, where the one or more second control messages indicate the at least one SBFD symbol or slot of the one or more SBFD symbols or slots is configured for SBFD communications by the UE and the second SBFD symbol or slot of the one or more SBFD symbols or slots is configured for half-duplex communications by the UE.

In some examples, the one or more second control messages indicate one or more durations associated with the configuration the one or more SBFD symbols or slots.

In some examples, the configuration component 1125 is capable of, configured to, or operable to support a means for transmitting one or more third control messages indicating whether each of the one or more SBFD symbols or slots supports SBFD communications by the UE or supports half-duplex communications by the UE.

In some examples, the one or more second control messages include one or more indices indicating the configuration of the one or more SBFD symbols or slots. In such cases, the one or more indices are per-SBFD symbol, per-SBFD slot, or both In some examples, a first index of the one or more indices indicates an SBFD symbol or slot of the one or more SBFD symbols or slots is configured for half-duplex communications by both a network entity and by the UE, a second index of the one or more indices indicates the SBFD symbol or slot of the one or more SBFD symbols or slots is configured for SBFD communications by the network entity and half-duplex communications by the UE, a third index of the one or more indices indicates the SBFD symbol or slot of the one or more SBFD symbols or slots is configured for SBFD communications by both the network entity and by the UE, a fourth index of the one or more indices indicates the SBFD symbol or slot of the one or more SBFD symbols or slots is configured for SBFD communications by the UE and half-duplex communications by the network entity.

In some examples, the one or more second control messages indicate a pattern identification associated with the configuration of the one or more SBFD symbols or slots.

In some examples, the pattern identification indicates a first subset of the one or more SBFD symbols or slots are configured for SBFD communications by the UE, a second subset of the one or more SBFD symbols or slots are configured for half-duplex communications by the UE, and one or more additional symbols or slots are configured for uplink, for downlink, are flexible, or any combination thereof.

In some examples, the one or more second control messages include an RRC message, a MAC-CE message, a DCI message, or any combination thereof. In some examples, the DCI message may be a scheduling DCI message, a non-scheduling DCI message, a group common DCI message, or any combination thereof In some examples, the configuration component 1125 is capable of, configured to, or operable to support a means for transmitting a second control message indicating a first set of parameters associated with SBFD communications by the UE and a second set of parameters associated with half-duplex communications by the UE, where communicating via both the uplink resources and the downlink resources during the at least one SBFD symbol or slot of the one or more SBFD symbols or slots is based on the first set of parameters, and where communicating via either the uplink resources or the downlink resources during the second SBFD symbol or slot of the one or more SBFD symbols or slots is based on the second set of parameters.

In some examples, the capability component 1140 is capable of, configured to, or operable to support a means for receiving a capability message indicating a capability of the UE to support SBFD communications, partially overlapping full-duplex communications, fully overlapping full-duplex communications, or any combination thereof, from a perspective of the UE, where communicating via both the uplink resources and the downlink resources is based on the capability of the UE to support SBFD communications, partially overlapping full-duplex communications, fully overlapping full-duplex communications, or any combination thereof.

In some examples, the capability component 1140 is capable of, configured to, or operable to support a means for receiving a capability message indicating the capability of the UE to support half duplex communications from a perspective of the UE and SBFD communications from a perspective of a network entity.

In some examples, to support communicating via both the uplink resources and the downlink resources during the at least one SBFD symbol or slot of the one or more SBFD symbols or slots, the full-duplex component 1130 is capable of, configured to, or operable to support a means for receiving uplink signaling via the uplink resources during the at least one SBFD symbol or slot of the one or more SBFD symbols or slots. In some examples, to support communicating via both the uplink resources and the downlink resources during the at least one SBFD symbol or slot of the one or more SBFD symbols or slots, the full-duplex component 1130 is capable of, configured to, or operable to support a means for transmitting downlink signaling via the downlink resources during the at least one SBFD symbol or slot of the one or more SBFD symbols or slots.

In some examples, the uplink resources are associated with one or more uplink sub-bands and the downlink resources are associated with one or more downlink sub-bands. In some examples, the control message is associated with a network entity operating according to an SBFD mode.

Figure 12:
FIG. 12 shows a diagram of a system including a device that supports techniques for UE SBFD operation in accordance with one or more aspects of the present disclosure.

FIG. 12 shows a diagram of a system 1200 including a device 1205 that supports techniques for UE SBFD operation in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting techniques for UE SBFD operation). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for transmitting a control message indicating configuration information associated with one or more SBFD symbols or slots, where the configuration information indicates both uplink resources and downlink resources within at least one SBFD symbol or slot of the one or more SBFD symbols or slots. The communications manager 1220 is capable of, configured to, or operable to support a means for communicating, with a single UE, via both the uplink resources and the downlink resources during the at least one SBFD symbol or slot of the one or more SBFD symbols or slots based at least in part on a capability of the UE.

By including or configuring the communications manager 1220 in accordance with examples as described herein, the device 1205 may support techniques for UE SBFD operations based on network entity SBFD operations, which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of techniques for UE SBFD operation as described herein, or the at least one processor 1235 and the at least one memory 1225 may be otherwise configured to, individually or collectively, perform or support such operations.

FIG. 13 shows a flowchart illustrating a method 1300 that supports techniques for UE SBFD operation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a control message indicating configuration information associated with one or more SBFD symbols or slots, where the configuration information indicates both uplink resources and downlink resources within at least one SBFD symbol or slot of the one or more SBFD symbols or slots. The operations of block 1305 may be performed in accordance with examples as disclosed herein. In some examples, aspects of the operations of 1305 may be performed by a configuration component 725 as described with reference to FIG. 7.

At 1310, the method may include selecting both the uplink resources and the downlink resources for the at least one SBFD symbol or slot of the one or more SBFD symbols or slots based on a capability of the UE. The operations of block 1310 may be performed in accordance with examples as disclosed herein. In some examples, aspects of the operations of 1310 may be performed by a resource selection component 730 as described with reference to FIG. 7.

At 1315, the method may include communicating via both the uplink resources and the downlink resources during the at least one SBFD symbol or slot of the one or more SBFD symbols or slots based on the selection. The operations of block 1315 may be performed in accordance with examples as disclosed herein. In some examples, aspects of the operations of 1315 may be performed by an antenna array component 735 as described with reference to FIG. 7.

FIG. 14 shows a flowchart illustrating a method 1400 that supports techniques for UE SBFD operation in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a capability message indicating a capability of the UE to support SBFD communications, partially overlapping full-duplex communications, fully overlapping full-duplex communications, or any combination thereof, from a perspective of the UE, where selecting both the uplink resources and the downlink resources is based on the capability of the UE to support SBFD communications, partially overlapping full-duplex communications, fully overlapping full-duplex communications, or any combination thereof. The operations of block 1405 may be performed in accordance with examples as disclosed herein. In some examples, aspects of the operations of 1405 may be performed by a reporting component 740 as described with reference to FIG. 7.

At 1410, the method may include receiving a control message indicating configuration information associated with one or more SBFD symbols or slots, where the configuration information indicates both uplink resources and downlink resources within at least one SBFD symbol or slot of the one or more SBFD symbols or slots. The operations of block 1410 may be performed in accordance with examples as disclosed herein. In some examples, aspects of the operations of 1410 may be performed by a configuration component 725 as described with reference to FIG. 7.

At 1415, the method may include selecting both the uplink resources and the downlink resources for the at least one SBFD symbol or slot of the one or more SBFD symbols or slots based on a capability of the UE. The operations of block 1415 may be performed in accordance with examples as disclosed herein. In some examples, aspects of the operations of 1415 may be performed by a resource selection component 730 as described with reference to FIG. 7.

At 1420, the method may include communicating via both the uplink resources and the downlink resources during the at least one SBFD symbol or slot of the one or more SBFD symbols or slots based on the selection. The operations of block 1420 may be performed in accordance with examples as disclosed herein. In some examples, aspects of the operations of 1420 may be performed by an antenna array component 735 as described with reference to FIG. 7.

FIG. 15 shows a flowchart illustrating a method 1500 that supports techniques for UE SBFD operation in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a control message indicating configuration information associated with one or more SBFD symbols or slots, where the configuration information indicates both uplink resources and downlink resources within at least one SBFD symbol or slot of the one or more SBFD symbols or slots. The operations of block 1505 may be performed in accordance with examples as disclosed herein. In some examples, aspects of the operations of 1505 may be performed by a configuration component 1125 as described with reference to FIG. 11.

At 1510, the method may include communicating, with a single UE, via both the uplink resources and the downlink resources during the at least one SBFD symbol or slot of the one or more SBFD symbols or slots based on a capability of the UE. The operations of block 1510 may be performed in accordance with examples as disclosed herein. In some examples, aspects of the operations of 1510 may be performed by a full-duplex component 1130 as described with reference to FIG. 11.

FIG. 16 shows a flowchart illustrating a method 1600 that supports techniques for UE SBFD operation in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a second control message indicating a first set of parameters associated with SBFD communications by the UE and a second set of parameters associated with half-duplex communications by the UE, where communicating via both the uplink resources and the downlink resources during the at least one SBFD symbol or slot of the one or more SBFD symbols or slots is based on the first set of parameters, and where communicating via either the uplink resources or the downlink resources during the second SBFD symbol or slot of the one or more SBFD symbols or slots is based on the second set of parameters. The operations of block 1605 may be performed in accordance with examples as disclosed herein. In some examples, aspects of the operations of 1605 may be performed by a configuration component 1125 as described with reference to FIG. 11.

At 1610, the method may include transmitting a control message indicating configuration information associated with one or more SBFD symbols or slots, where the configuration information indicates both uplink resources and downlink resources within at least one SBFD symbol or slot of the one or more SBFD symbols or slots. The operations of block 1610 may be performed in accordance with examples as disclosed herein. In some examples, aspects of the operations of 1610 may be performed by a configuration component 1125 as described with reference to FIG. 11.

At 1615, the method may include communicating, with a single UE, via both the uplink resources and the downlink resources during the at least one SBFD symbol or slot of the one or more SBFD symbols or slots based on a capability of the UE. The operations of block 1615 may be performed in accordance with examples as disclosed herein. In some examples, aspects of the operations of 1615 may be performed by a full-duplex component 1130 as described with reference to FIG. 11.

At 1620, the method may include communicating via either the uplink resources or the downlink resources during the second SBFD symbol or slot of the one or more SBFD symbols or slots based on the second SBFD symbol or slot supporting half-duplex communications by the UE. The operations of block 1620 may be performed in accordance with examples as disclosed herein. In some examples, aspects of the operations of 1620 may be performed by a half-duplex component 1135 as described with reference to FIG. 11.

The following provides an overview of aspects of the present disclosure:

Aspect 1: A method for wireless communications at a UE, comprising: receiving a control message indicating configuration information associated with one or more SBFD symbols or slots, wherein the configuration information indicates both uplink resources and downlink resources within at least one SBFD symbol or slot of the one or more SBFD symbols or slots; selecting both the uplink resources and the downlink resources for the at least one SBFD symbol or slot of the one or more SBFD symbols or slots based at least in part on a capability of the UE; and communicating via both the uplink resources and the downlink resources during the at least one SBFD symbol or slot of the one or more SBFD symbols or slots based at least in part on the selection.

Aspect 2: The method of aspect 1, wherein the configuration information further indicates either uplink resources or downlink resources within a second SBFD symbol or slot of the one or more SBFD symbols or slots, the method further comprising: selecting either the uplink resources or the downlink resources for the second SBFD symbol or slot of the one or more SBFD symbols or slots based at least in part on the second SBFD symbol or slot supporting half-duplex communications by the UE; and communicating via either the uplink resources or the downlink resources during the second SBFD symbol or slot based at least in part on the selection.

Aspect 3: The method of aspect 2, further comprising: receiving one or more second control messages indicating a configuration of each of the one or more SBFD symbols or slots, wherein the one or more second control messages indicate the at least one SBFD symbol or slot of the one or more SBFD symbols or slots is configured for SBFD communications by the UE and the second SBFD symbol or slot of the one or more SBFD symbols or slots is configured for half-duplex communications by the UE.

Aspect 4: The method of aspect 3, wherein the one or more second control messages indicates one or more durations associated with the configuration the one or more SBFD symbols or slots.

Aspect 5: The method of any of aspects 3 through 4, further comprising: receiving one or more third control messages indicating whether each of the one or more SBFD symbols or slots supports SBFD communications by the UE or supports half-duplex communications by the UE Aspect 6: The method of any of aspects 3 through 5, wherein the one or more second control messages comprise one or more indices indicating the configuration of the one or more SBFD symbols or slots, and the one or more indices are per-SBFD symbol, per-SBFD slot, or both.

Aspect 7: The method of aspect 6, wherein a first index of the one or more indices indicates an SBFD symbol or slot of the one or more SBFD symbols or slots is configured for half-duplex communications by a network entity and by the UE, a second index of the one or more indices indicates the SBFD symbol or slot of the one or more SBFD symbols or slots is configured for SBFD communications by the network entity and half-duplex communications by the UE, a third index of the one or more indices indicates the SBFD symbol or slot of the one or more SBFD symbols or slots is configured for SBFD communications by the network entity and by the UE, and a fourth index of the one or more indices indicates the SBFD symbol or slot of the one or more SBFD symbols or slots is configured for SBFD communications by the UE and half-duplex communications by the network entity.

Aspect 8: The method of any of aspects 3 through 7, wherein the one or more second control messages indicate a pattern identification associated with the configuration of the one or more SBFD symbols or slots.

Aspect 9: The method of aspect 8, wherein the pattern identification indicates a first subset of the one or more SBFD symbols or slots are configured for SBFD communications by the UE, a second subset of the one or more SBFD symbols or slots are configured for half-duplex communications by the UE, and one or more additional symbols or slots are configured for uplink, for downlink, are flexible, or any combination thereof.

Aspect 10: The method of any of aspects 3 through 9, wherein the one or more second control messages comprise an RRC message, a MAC-CE message, a DCI message, or any combination thereof, and the DCI message may be a scheduling DCI message, a non-scheduling DCI message, a group common DCI message, or any combination thereof.

Aspect 11: The method of any of aspects 2 through 10, further comprising: receiving a second control message indicating a first set of parameters associated with SBFD communications by the UE and a second set of parameters associated with half-duplex communications by the UE, wherein communicating via both the uplink resources and the downlink resources during the at least one SBFD symbol or slot of the one or more SBFD symbols or slots is based at least in part on the first set of parameters, and wherein communicating via either the uplink resources or the downlink resources during the second SBFD symbol or slot of the one or more SBFD symbols or slots is based at least in part on the second set of parameters.

Aspect 12: The method of any of aspects 1 through 11, further comprising: transmitting a capability message indicating the capability of the UE to support perform SBFD communications, or partial overlapping full-duplex communications, or fully overlapping full-duplex communications, or any combination thereof, from a perspective of the UE at the UE side, wherein selecting both the uplink resources and the downlink resources is based at least in part on the capability of the UE to support SBFD communications, partially overlapping full-duplex communications, fully overlapping full-duplex communications, or any combination thereof Aspect 13: The method of any of aspects 1 through 12, further comprising: transmitting a capability message indicating the capability of the UE to support half duplex communications from a perspective of the UE and SBFD communications from a perspective of a network entity.

Aspect 14: The method of any of aspects 1 through 13, wherein communicating via both the uplink resources and the downlink resources during the at least one SBFD symbol or slot of the one or more SBFD symbols or slots comprises: transmitting uplink signaling via a first antenna panel at the UE and via the uplink resources during the at least one SBFD symbol or slot of the one or more SBFD symbols or slots; and receiving downlink signaling via a second antenna panel at the UE and via the downlink resources during the second SBFD symbol or slot of the one or more SBFD symbols or slots.

Aspect 15: The method of any of aspects 1 through 14, wherein the uplink resources are associated with one or more uplink sub-bands and the downlink resources are associated with one or more downlink sub-bands.

Aspect 16: The method of any of aspects 1 through 15, wherein the control message is associated with a network entity operating according to an SBFD mode.

Aspect 17: A method for wireless communications at a network entity comprising: transmitting a control message indicating configuration information associated with one or more SBFD symbols or slots, wherein the configuration information indicates both uplink resources and downlink resources within at least one SBFD symbol or slot of the one or more SBFD symbols or slots; and communicating, with a single UE, via both the uplink resources and the downlink resources during the at least one SBFD symbol or slot of the one or more SBFD symbols or slots based at least in part on a capability of the UE.

Aspect 18: The method of aspect 17, wherein the configuration information further indicates either uplink resources or downlink resources within a second SBFD symbol or slot of the one or more SBFD symbols or slots, the method further comprising: communicating via either the uplink resources or the downlink resources during the second SBFD symbol or slot of the one or more SBFD symbols or slots based at least in part on the second SBFD symbol or slot supporting half-duplex communications by the UE.

Aspect 19: The method of aspect 18, further comprising: transmitting one or more second control messages indicating a configuration of each of the one or more SBFD symbols or slots, wherein the one or more second control messages indicate the at least one SBFD symbol or slot of the one or more SBFD symbols or slots is configured for SBFD communications by the UE and the second SBFD symbol or slot of the one or more SBFD symbols or slots is configured for half-duplex communications by the UE.

Aspect 20: The method of aspect 19, wherein the one or more second control messages indicates one or more durations associated with the configuration the one or more SBFD symbols or slots.

Aspect 21: The method of aspect 20, further comprising: transmitting one or more third control messages indicating whether each of the one or more SBFD symbols or slots supports SBFD communications by the UE or supports half-duplex communications by the UE Aspect 22: The method of any of aspects 19 through 21, wherein the one or more second control messages comprise one or more indices indicating the configuration of the one or more SBFD symbols or slots, and the one or more indices are per-SBFD symbol, per-SBFD slot, or both.

Aspect 23: The method of aspect 22, wherein a first index of the one or more indices indicates an SBFD symbol or slot of the one or more SBFD symbols or slots is configured for half-duplex communications by both a network entity and by the UE, a second index of the one or more indices indicates the SBFD symbol or slot of the one or more SBFD symbols or slots is configured for SBFD communications by the network entity and half-duplex communications by the UE, a third index of the one or more indices indicates the SBFD symbol or slot of the one or more SBFD symbols or slots is configured for SBFD communications by both the network entity and by the UE, a fourth index of the one or more indices indicates the SBFD symbol or slot of the one or more SBFD symbols or slots is configured for SBFD communications by the UE and half-duplex communications by the network entity.

Aspect 24: The method of any of aspects 19 through 23, wherein the one or more second control messages indicate a pattern associated with the configuration of the one or more SBFD symbols or slots.

Aspect 25: The method of aspect 24, wherein the pattern indicates a first subset of the one or more SBFD symbols or slots are configured for SBFD communications by the UE and a second subset of the one or more SBFD symbols or slots are configured for half-duplex communications by the UE, and one or more additional symbols or slots are configured for uplink, for downlink, are flexible, or any combination thereof.

Aspect 26: The method of any of aspects 19 through 25, wherein the one or more second control messages comprise an RRC message, a MAC-CE message, a DCI message, or any combination thereof, and the DCI message may be a scheduling DCI message, a non-scheduling DCI message, a group common DCI message, or any combination thereof.

Aspect 27: The method of any of aspects 18 through 26, further comprising: transmitting a second control message indicating a first set of parameters associated with SBFD communications by the UE and a second set of parameters associated with half-duplex communications by the UE, wherein communicating via both the uplink resources and the downlink resources during the at least one SBFD symbol or slot of the one or more SBFD symbols or slots is based at least in part on the first set of parameters, and wherein communicating via either the uplink resources or the downlink resources during the second SBFD symbol or slot of the one or more SBFD symbols or slots is based at least in part on the second set of parameters.

Aspect 28: The method of any of aspects 17 through 27, further comprising: receiving a capability message indicating the capability of the UE to support perform SBFD communications, or partial overlapping full-duplex communications, or fully overlapping full-duplex communications, or any combination thereof, from a perspective of the UE at the UE side, wherein selecting both the uplink resources and the downlink resources is based at least in part on the capability of the UE to support SBFD communications, partially overlapping full-duplex communications, fully overlapping full-duplex communications, or any combination thereof Aspect 29: The method of any of aspects 17 through 28, further comprising: receiving a capability message indicating the capability of the UE to support half duplex communications from a perspective of the UE and SBFD communications from a perspective of a network entity.

Aspect 30: The method of any of aspects 17 through 29, wherein communicating via both the uplink resources and the downlink resources during the at least one SBFD symbol or slot of the one or more SBFD symbols or slots comprises: receiving uplink signaling via the uplink resources during the at least one SBFD symbol or slot of the one or more SBFD symbols or slots; and transmitting downlink signaling via the downlink resources during the at least one SBFD symbol or slot of the one or more SBFD symbols or slots.

Aspect 31: The method of any of aspects 17 through 30, wherein the uplink resources are associated with one or more uplink sub-bands and the downlink resources are associated with one or more downlink sub-bands.

Aspect 32: The method of any of aspects 17 through 31, wherein the control message is associated with the network entity operating according to an SBFD mode.

Aspect 33: A UE for wireless communications, comprising one or more memories storing processor-executable code, and one or more processors coupled with the one or more memories and individually or collectively operable to execute the code to cause the UE to perform a method of any of aspects 1 through 16.

Aspect 34: A UE for wireless communications, comprising at least one means for performing a method of any of aspects 1 through 16.

Aspect 35: A non-transitory computer-readable medium storing code for wireless communications, the code comprising instructions executable by a processor to perform a method of any of aspects 1 through 16.

Aspect 36: An apparatus for wireless communications, comprising one or more memories storing processor-executable code, and one or more processors coupled with the one or more memories and individually or collectively operable to execute the code to cause the apparatus to perform a method of any of aspects 17 through 32.

Aspect 37: An apparatus for wireless communications, comprising at least one means for performing a method of any of aspects 17 through 32.

Aspect 38: A non-transitory computer-readable medium storing code for wireless communications, the code comprising instructions executable by a processor to perform a method of any of aspects 17 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive a control message indicating configuration information associated with one or more sub-band full-duplex (SBFD) symbols or slots, wherein the configuration information indicates both uplink resources and downlink resources that overlap in a time domain within at least one SBFD symbol or slot of the one or more SBFD symbols or slot;
select both the uplink resources and the downlink resources that overlap in the time domain within the at least one SBFD symbol or slot of the one or more SBFD symbols or slots based at least in part on a capability of the UE to support full-duplex communications from a perspective of the UE and based at least in part on the configuration information indicating both the uplink resources and the downlink resources; and
communicating via both the uplink resources and the downlink resources that overlap in a time domain during the at least one SBFD symbol or slot of the one or more SBFD symbols or slot based at least in part on the selection.

2. The UE of claim 1, wherein the configuration information further indicates either uplink resources or downlink resources within a second SBFD symbol or slot of the one or more SBFD symbols or slots, and the one or more processors are individually or collectively further operable to execute the code to cause the UE to:
select either the uplink resources or the downlink resources for the second SBFD symbol or slot of the one or more SBFD symbols or slots based at least in part on the second SBFD symbol or slot supporting half-duplex communications by the UE; and
communicating via either the uplink resources or the downlink resources during the second SBFD symbol or slot based at least in part on the selection.

3. The UE of claim 2, wherein the one or more processors are individually or collectively further operable to execute the code to cause the UE to:
receive one or more second control messages indicating a configuration of each of the one or more SBFD symbols or slots, wherein the one or more second control messages indicate the at least one SBFD symbol or slot of the one or more SBFD symbols or slots is configured for SBFD communications by the UE and the second SBFD symbol or slot of the one or more SBFD symbols or slots is configured for half-duplex communications by the UE.

4. The UE of claim 3, wherein the one or more second control messages indicate one or more durations associated with the configuration the one or more SBFD symbols or slots.

5. The UE of claim 3, wherein the one or more processors are individually or collectively further operable to execute the code to cause the UE to:

receive one or more third control messages indicating whether each of the one or more SBFD symbols or slots supports SBFD communications by the UE or supports half-duplex communications by the UE.

6. The UE of claim 3, wherein the one or more second control messages comprise one or more indices indicating the configuration of the one or more SBFD symbols or slots, and wherein the one or more indices are per-SBFD symbol, per-SBFD slot, or both.

7. The UE of claim 6, wherein a first index of the one or more indices indicates an SBFD symbol or slot of the one or more symbols or SBFD slots is configured for half-duplex communications by a network entity and by the UE, a second index of the one or more indices indicates the SBFD symbol or slot of the one or more SBFD symbols or slots is configured for SBFD communications by the network entity and half-duplex communications by the UE, a third index of the one or more indices indicates the SBFD symbol or slot of the one or more SBFD symbols or slots is configured for SBFD communications by the network entity and by the UE, and a fourth index of the one or more indices indicates the SBFD symbol or slot of the one or more SBFD symbols or slots is configured for SBFD communications by the UE and half-duplex communications by the network entity.

8. The UE of claim 3, wherein the one or more second control messages indicate a pattern identification associated with the configuration of the one or more SBFD symbols or slots.

9. The UE of claim 8, wherein the pattern identification indicates a first subset of the one or more SBFD symbols or slots are configured for SBFD communications by the UE, a second subset of the one or more SBFD symbols or slots are configured for half-duplex communications by the UE, and one or more additional symbols or slots are configured for uplink, for downlink, are flexible, or any combination thereof.

10. The UE of claim 3, wherein the one or more second control messages comprise a radio resource control (RRC) message, a medium access control (MAC) control element (MAC-CE) message, a downlink control information (DCI) message, or any combination thereof, and wherein the DCI message may be a scheduling DCI message, a non-scheduling DCI message, a group common DCI message, or any combination thereof.

11. The UE of claim 2, wherein the one or more processors are individually or collectively further operable to execute the code to cause the UE to:
receive a second control message indicating a first set of parameters associated with SBFD communications by the UE and a second set of parameters associated with half-duplex communications by the UE, wherein communicating via both the uplink resources and the downlink resources during the at least one SBFD symbol or slot of the one or more SBFD symbols or slots is based at least in part on the first set of parameters, and wherein communicating via either the uplink resources or the downlink resources during the second SBFD symbol or slot of the one or more SBFD symbols or slots is based at least in part on the second set of parameters.

12. The UE of claim 1, wherein the one or more processors are individually or collectively further operable to execute the code to cause the UE to:
transmit a capability message indicating the capability of the UE to support full-duplex communications from the perspective of the UE, wherein the capability of the UE to support full-duplex communications from the perspective of the UE comprises a capability to support SBFD communications, partial overlapping full-duplex communications, fully overlapping full-duplex communications, or any combination thereof, from the perspective of the UE, wherein selecting both the uplink resources and the downlink resources is based at least in part on the capability of the UE to support SBFD communications, partially overlapping full-duplex communications, fully overlapping full-duplex communications, or any combination thereof.

13. The UE of claim 1, wherein the one or more processors are individually or collectively further operable to execute the code to cause the UE to:

transmit a capability message indicating the capability of the UE to support half duplex communications from a perspective of the UE and SBFD communications from a perspective of a network entity.

14. The UE of claim 1, wherein, to communicating via both the uplink resources and the downlink resources during the at least one SBFD symbol or slot of the one or more SBFD symbols or slots, the one or more processors are individually or collectively operable to execute the code to cause the UE to:

transmit uplink signaling via a first antenna panel at the UE and via the uplink resources during the at least one SBFD symbol or slot of the one or more SBFD symbols or slots; and receive downlink signaling via a second antenna panel at the UE and via the downlink resources during the at least one SBFD symbol or slot of the one or more SBFD symbols or slots.

15. A network entity, comprising:

one or more memories storing processor-executable code; and one or more processors coupled with the one or more memories and individually or collectively operable to execute the code to cause the network entity to:

transmit a control message indicating configuration information associated with one or more sub-band full-duplex (SBFD) symbols or slots, wherein the configuration information indicates both uplink resources and downlink resources that overlap in a time domain within at least one SBFD symbol or slot of the one or more SBFD symbols or slots; and communicating, with a single user equipment (UE), via both the uplink resources and the downlink resources that overlap in the time domain during the at least one SBFD symbol or slot of the one or more SBFD symbols or slots based at least in part on a capability of the UE to support full-duplex communications from a perspective of the UE and based at least in part on the configuration information indicating both the uplink resources and the downlink resources.

16. The network entity of claim 15, wherein the configuration information further indicates either uplink resources or downlink resources within a second SBFD symbol or slot of the one or more SBFD symbols or slots, and the one or more processors are individually or collectively further operable to execute the code to cause the network entity to:

communicating via either the uplink resources or the downlink resources during the second SBFD symbol or slot of the one or more SBFD symbols or slots based at least in part on the second SBFD symbol or slot supporting half-duplex communications by the UE.

17. The network entity of claim 16, wherein the one or more processors are individually or collectively further operable to execute the code to cause the network entity to:

transmit one or more second control messages indicating a configuration of each of the one or more SBFD symbols or slots, wherein the one or more second control messages indicate the at least one SBFD symbol or slot of the one or more SBFD symbols or slots is configured for SBFD communications by the UE and the second SBFD symbol or slot of the one or more SBFD symbols or slots is configured for half-duplex communications by the UE.

18. The network entity of claim 17, wherein the one or more second control messages indicate one or more durations associated with the configuration the one or more SBFD symbols or slots.

19. The network entity of claim 18, wherein the one or more processors are individually or collectively further operable to execute the code to cause the network entity to:

transmit one or more third control messages indicating whether each of the one or more SBFD symbols or slots supports SBFD communications by the UE or supports half-duplex communications by the UE.

20. The network entity of claim 17, wherein the one or more second control messages comprise one or more indices indicating the configuration of the one or more SBFD symbols or slots, and wherein the one or more indices are per-SBFD symbol, per-SBFD slot, or both.

21. The network entity of claim 20, wherein a first index of the one or more indices indicates an SBFD symbol or slot of the one or more SBFD symbols or slots is configured for half-duplex communications by both a network entity and by the UE, a second index of the one or more indices indicates the SBFD symbol or slot of the one or more SBFD symbols or slots is configured for SBFD communications by the network entity and half-duplex communications by the UE, a third index of the one or more indices indicates the SBFD symbol or slot of the one or more SBFD symbols or slots is configured for SBFD communications by both the network entity and by the UE, a fourth index of the one or more indices indicates the SBFD symbol or slot of the one or more SBFD symbols or slots is configured for SBFD communications by the UE and half-duplex communications by the network entity.

22. The network entity of claim 17, wherein the one or more second control messages indicate a pattern identification associated with the configuration of the one or more SBFD symbols or slots.

23. The network entity of claim 22, wherein the pattern identification indicates a first subset of the one or more SBFD symbols or slots are configured for SBFD communications by the UE, a second subset of the one or more SBFD symbols or slots are configured for half-duplex communications by the UE, and one or more additional symbols or slots are configured for uplink, for downlink, are flexible, or any combination thereof.

24. The network entity of claim 17, wherein the one or more second control messages comprise a radio resource control (RRC) message, a medium access control (MAC) control element (MAC-CE) message, a downlink control information (DCI) message, or any combination thereof, and wherein the DCI message may be a scheduling DCI message, a non-scheduling DCI message, a group common DCI message, or any combination thereof.

25. The network entity of claim 16, wherein the one or more processors are individually or collectively further operable to execute the code to cause the network entity to:

transmit a second control message indicating a first set of parameters associated with SBFD communications by the UE and a second set of parameters associated with half-duplex communications by the UE, wherein communicating via both the uplink resources and the downlink resources during the at least one SBFD symbol or slot of the one or more SBFD symbols or slots is based at least in part on the first set of parameters, and wherein communicating via either the uplink resources or the downlink resources during the second SBFD symbol or slot of the one or more SBFD symbols or slots is based at least in part on the second set of parameters.

26. The network entity of claim 15, wherein the one or more processors are individually or collectively further operable to execute the code to cause the network entity to:

receive a capability message indicating the capability of the UE to support full-duplex communications from the perspective of the UE, wherein the capability of the UE to support full-duplex communications from the perspective of the UE comprises a capability to support SBFD communications, partial overlapping full-duplex communications, fully overlapping full-duplex communications, or any combination thereof, from the perspective of the UE, wherein selecting both the uplink resources and the downlink resources is based at least in part on the capability of the UE to support SBFD communications, partially overlapping full-duplex communications, fully overlapping full-duplex communications, or any combination thereof.

27. The network entity of claim 15, wherein the one or more processors are individually or collectively further operable to execute the code to cause the network entity to:

receive a capability message indicating the capability of the UE to support half duplex communications from a perspective of the UE and SBFD communications from a perspective of a network entity.

28. The network entity of claim 15, wherein, to communicating via both the uplink resources and the downlink resources during the at least one SBFD symbol or slot of the one or more SBFD symbols or slots, the one or more processors are individually or collectively operable to execute the code to cause the network entity to:

receive uplink signaling via the uplink resources during the at least one SBFD symbol or slot of the one or more SBFD symbols or slots; and transmit downlink signaling via the downlink resources during the at least one SBFD symbol or slot of the one or more SBFD symbols or slots.

29. A method for wireless communications at a user equipment (UE), comprising:

receiving a control message indicating configuration information associated with one or more sub-band full-duplex (SBFD) symbols or slots, wherein the configuration information indicates both uplink resources and downlink resources that overlap in a time domain within at least one SBFD symbol or slot of the one or more SBFD symbols or slots;

selecting both the uplink resources and the downlink resources that overlap in the time domain the at least one SBFD symbol or slot of the one or more SBFD symbols or slots based at least in part on a capability of the UE to support full-duplex communications from a perspective of the UE and based at least in part on the configuration information indicating both the uplink resources and the downlink resources; and communicating via both the uplink resources and the downlink resources that overlap in the time domain during the at least one SBFD symbol or slot of the one or more SBFD symbols or slots based at least in part on the selection.

30. A method for wireless communications at a network entity comprising:

transmitting a control message indicating configuration information associated with one or more sub-band full-duplex (SBFD) symbols or slots, wherein the configuration information indicates both uplink resources and downlink resources that overlap in a time domain within at least one SBFD symbol or slot of the one or more SBFD symbols or slots; and communicating, with a single user equipment (UE), via both the uplink resources and the downlink resources that overlap in a time domain during the at least one SBFD symbol or slot of the one or more SBFD symbols or slots based at least in part on a capability of the UE to support full-duplex communications from a perspective of the UE and based at least in part on the configuration information indicating both the uplink resources and the downlink resources.

* * * * *